US010113537B2

(12) United States Patent
Tonazzini et al.

(10) Patent No.: US 10,113,537 B2
(45) Date of Patent: Oct. 30, 2018

(54) VARIABLE STIFFNESS DEVICE AND METHOD OF MANUFACTURING THE SAME

(71) Applicant: Ecole Polytechnique Fédérale de Lausanne (EPFL), Lausanne (CH)

(72) Inventors: Alice Tonazzini, Lausanne (CH); Stefano Mintchev, Lausanne (CH); Dario Floreano, Saint-Prex (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 130 days.

(21) Appl. No.: 15/093,799

(22) Filed: Apr. 8, 2016

(65) Prior Publication Data
US 2017/0292502 A1    Oct. 12, 2017

(51) Int. Cl.
*F03G 7/06* (2006.01)
*B22D 19/00* (2006.01)
*B22D 21/00* (2006.01)
*B22D 30/00* (2006.01)

(52) U.S. Cl.
CPC ............... *F03G 7/06* (2013.01); *B22D 19/00* (2013.01); *B22D 21/007* (2013.01); *B22D 30/00* (2013.01)

(58) Field of Classification Search
CPC .. A61M 2025/0064; A61M 2025/0915; A61M 2025/09158; A61M 2205/0266; F03G 7/0065
See application file for complete search history.

(56) References Cited

U.S. PATENT DOCUMENTS

| | | | |
|---|---|---|---|
| 3,690,065 | A | 11/1972 | Bucalo |
| 4,887,429 | A | 12/1989 | Birli, Sr. et al. |
| 5,226,899 | A | 7/1993 | Lee et al. |
| 5,816,493 | A | 10/1998 | Pirkle |
| 7,901,524 | B1 | 3/2011 | McKnight et al. |
| 8,409,691 | B1 | 4/2013 | Henry et al. |
| 8,551,019 | B1 | 10/2013 | Kroll |
| 2005/0027244 | A1 | 2/2005 | Eidenschink |
| 2007/0243073 | A1 | 10/2007 | Thomsen, III et al. |
| 2012/0179097 | A1 | 7/2012 | Cully et al. |

(Continued)

FOREIGN PATENT DOCUMENTS

| | | |
|---|---|---|
| CN | 104825229 | 8/2015 |
| EP | 1138342 | 10/2001 |
| JP | H05248345 A | 9/1993 |

(Continued)

OTHER PUBLICATIONS

Machine translation of CN104825229A, accessed on Jan. 18, 2018.*

(Continued)

*Primary Examiner* — Jonathan Matthias
(74) *Attorney, Agent, or Firm* — Andre Roland S.A.; Nikolaus Schibli

(57) ABSTRACT

A variable stiffness device, including a core including a low melting point alloy, an encapsulation surrounding the core, the encapsulation made of an elastic material and sealing the core, and a heating device arranged around the encapsulation, configured to heat the core, wherein the elastic material of the encapsulation is subject to a tensile stress in a direction along a longitudinal extension of the thread-like variable stiffness device.

14 Claims, 28 Drawing Sheets core 20 : solid core 20 : liquid

(56) References Cited

U.S. PATENT DOCUMENTS

| | | | |
|---|---|---|---|
| 2015/0113975 A1 | 4/2015 | Riley et al. | |
| 2016/0311108 A1* | 10/2016 | Alambeigi | B25J 9/06 |

FOREIGN PATENT DOCUMENTS

| | | |
|---|---|---|
| WO | WO9634211 | 10/1996 |
| WO | WO03047675 | 6/2003 |
| WO | WO2004064593 | 8/2004 |
| WO | WO2004064891 | 8/2004 |
| WO | WO2007015981 | 2/2007 |
| WO | WO2012043178 | 4/2012 |
| WO | WO2013086023 | 6/2013 |
| WO | WO2015193089 | 12/2015 |

OTHER PUBLICATIONS

A. Gokhan, X. Wang, F. Gordaninejad, A novel two-way-controllable magneto-rheological fluid damper. Smart Mater. Struct. 19(6), 065024 (2010).

A. Kasprowicz, M. Smolarkiewicz, M. Wierzchowiecka, M. Michalak, P. Wojtaszek, Introduction: tensegral world of plants. In Mechanical Integration of Plant Cells and Plants (pp. 1-25). Springer Berlin Heidelberg (2011).

A. Lipchitz, T. Imbert, G. D. Harvel, Investigation of fluid dynamic properties of liquid field's metal. In ASME Power Conference, Boston, MA, USA (2013).

A. Loeve, P. Breedveld, J. Dankelman, Scopes Too Flexible . . . and Too Stiff. IEEE Pulse 1(3), 26-41 (2010).

A. Sadeghi, L. Beccai, B. Mazzolai, Innovative Soft Robots Based on Electro-Rheological Fluids. in International Conference on Intelligent Robots and Systems, Vilamoura, Portugal (2012).

B. E. Schubert, D. Floreano, Variable stiffness material based on rigid low-melting-point-alloy microstructures embedded in soft poly(dimethylsiloxane) (PDMS). Rsc Adv. 3(46), 24671-24679 (2013).

B. Moulia, C. Coutand, J. L. Julien, Mechanosensitive control of plant growth: bearing the load, sensing, transducing, and responding. Front. Plant. Sci. 6(52), 1-20 (2015).

C. D. Onal, D. Rus, A modular approach to soft robots. In IEEE RAS/EMBS International Conference on Biomedical Robotics and Biomechatronics, Rome, Italy (2012).

C. Liu, H. Qin, P. T. Mather, Review of progress in shape-memory polymers. J. Mater. Chem. 17(16), 1543-1558 (2007).

C. Majidi, R. J. Wood, Tunable elastic stiffness with microconfined magnetorheological domains at low magnetic field. Appl. Phys. Lett. 97(16), 164104 (2010).

C. Rossa, A. Jaegy, A. Micaelli, J. Lozada, Development of a multilayered wide-ranged torque magnetorheological brake. Smart Mater. Struct.23(2), 025028 (2014).

Chen, Yijin, et al. "Variable stiffness property study on shape memory polymer composite tube." Smart Materials and Structures 21.9 (2012): 094021.

Chenal, Thomas P., et al. "Variable stiffness fabrics with embedded shape memory materials for wearable applications." Intelligent Robots and Systems (IROS 2014), 2014 IEEE/RSJ International Conference on. IEEE, 2014.

D. Rus, M. T. Tolley, Design, fabrication and control of soft robots. Nature 521(7553), 467-475 (2015).

D. Trivedi, C. D. Rahn, W.N. Kier, I. D. Walker, Soft robotics: Biological inspiration, state of the art, and future research. Appl. Bionics Biomech.5, 99-117 (2008).

Dong, Hua, and Glenn M. Walker. "Adjustable stiffness tubes via thermal modulation of a low melting point polymer." Smart Materials and Structures 21.4 (2012): 042001.

F. Ilievski, A. D. Mazzeo, R. F. Shepherd, X. Chen, G. M. Whitesides, Soft robotics for chemists. Angew. Chem. 50(8), 1890-1895 (2011).

I. S. Wallace, C. T. Anderson, Small molecule probes for plant cell wall polysaccharide imaging. Front. Plant. Sci. 3(89), 1-8 (2012).

J. H. Kim, J. H. Oh, Development of an above knee prosthesis using MR damper and leg simulator. IEEE International Conference on Robotics and Automation, (2001).

J. Shintake, S. Rosset, B. E. Schubert, D. Floreano, H. Shea, Versatile soft grippers with intrinsic electroadhesion based on multifunctional polymer actuators. Adv. Mater. 28(2), 231-238 (2016).

K. Suzumori, S. Endo, T. Kanda, N. Kato, H. Suzuki, A bending pneumatic rubber actuator realizing soft-bodied manta swimming robot. inIEEE International Conference on Robotics and Automation, Rome, Italy (2007).

K. Suzumori, S. Iikura. H. Tanaka, Applying a flexible microactuator to robotic mechanisms. IEEE Control Syst. Mag. 12(1), 21-27 (1992).

K. Takashima, J. Rossiter, T. Mukai, McKibben artificial muscle using shape-memory polymer. Sens. Actuators, A 164(1-2), 116-124 (2010).

K. Takashima, T. Noritsugu, J. Rossiter, S. Guo, T. Mukai, Curved type pneumatic artificial rubber muscle using shape-memory polymer. J. Robot. Mechatron. 24(3), 472-479 (2012).

L. Daler, S. Mintchev, C. Stefanini, D. Floreano, A bioinspired multi-modal flying and walking robot. Bioinspir. Biomim. 10(1), 016005 (2015).

M. A. McEvoy, N. Correll, Materials that couple sensing, actuation, computation, and communication. Science, 347(6228), 1261689 (2015).

M. A. McEvoy, N. Correll, Thermoplastic variable stiffness composites with embedded, networked sensing, actuation, and control. Compos. Sci. Technol. 49(15), 1799-1808 (2015).

M. A. Meyers, P. Y. Chen, A. Y. M. Lin, Y. Seki, Biological materials: structure and mechanical properties. Prog. Mater Sci. 53(1), 1-206 (2008).

M. C. S. Yuen, R. A. Bilodeau, R. Kramer, Active variable stiffness fibers for multifunctional robotic fabrics. IEEE Robot. Autom. Lett. 1(2), 708-715 (2016).

M. E. Hossain, C. Ketata, M. R. Islam, Experimental study of physical and mechanical properties of natural and synthetic waxes using uniaxial compressive strength test. in International Conference on Modeling, Simulation and Applied Optimization, Sharjah, UAE (2009).

N. C. Rosenfield, N. M. Werely, Volume-constrained optimization of magnetorheological and electrorheological valves and dampers. Smart Mater. Struct. 13(6), 1303-1313 (2004).

N. G. Cheng, A. Gopinath, L. Wang, K. Iagnemma, A. E. Hosoi, Thermally Tunable, Self-Healing Composites for Soft Robotic Applications.Macromol. Mater. Eng. 299(11), 1279-1284 (2014).

R. Deimel, O. Brock, A novel type of compliant, underactuated robotic hand for dexterous grasping. Int. J. Robot. Res. 35(1-3), 161-185 (2016).

R. F. Shepherd et al, Multigait soft robot. Proc. Natl. Acad. Sci. 108(51), 20400-20403 (2011).

S. V. Deshpande, An experimental study of pressure-volume dynamics of casting materials. Injury, 36(9), 1067-1074 (2005)

S. Xu, et al., Soft microfluidic assemblies of sensors, circuits and radios for the skin. Science 344(6179), 70-74 (2014).

Shan, Ying, et al. "Variable stiffness structures utilizing fluidic flexible matrix composites." Journal of Intelligent Material Systems and Structures 20.4 (2009): 443-456.

T. Ranzani, G. Gerboni, M. Cianchetti, A. Menciassi, A bioinspired soft manipulator for minimally invasive surgery. Bioinspir. Biomim. 10(3), 035008 (2015).

Takashima, Kazuto, et al. "Pneumatic artificial rubber muscle using shape-memory polymer sheet with embedded electrical heating wire." Smart Materials and Structures 23.12 (2014): 125005.

Van Meerbeek, Ilse M., et al. "Morphing Metal and Elastomer Bicontinuous Foams for Reversible Stiffness, Shape Memory, and Self-Healing Soft Machines." Advanced Materials (2016).

W. Frontera, The importance of technology in rehabilitation. IEEE Eng. Med. Biol. Mag. 22(3), 25 (2003).

W. L. Shan, T. Lu, Z. H. Wang, C. Majidi, Thermal analysis and design of a multi-layered rigidity tunable composite, Int. J. Heat Mass Ttran, 66,271-278 (2013).

(56) References Cited

OTHER PUBLICATIONS

W. Shan, S. Diller, A. Tutcuoglu, C. Majidi, Rigidity-tuning conductive elastomer. Smart Mater. Struct. 24(6), 065001 (2015).
W. Shan, T. Lu, C. Majid, Soft-matter composites with electrically tunable elastic rigidity. Smart Mater. Struct. 22(8), 085005 (2013).
W. Wang, H. Rodrigue, S. H. Ahn, Deployable soft composite structures. Sci. Rep. 6, 20869 (2016).
Y. L. Park , J. Santos K. G. Galloway, E. C. Goldfield, R. J. Wood, A soft wearable robotic device for active knee motions using flat pneumatic artificial muscles. in IEEE International Conference on Robotics and Automation, Hong Kong, China (2014).
Y. Shan, M. P. Philen, C. E. Bakis, K. W. Wang, C. D. Rahn, Nonlinear-elastic finite axisymmetric deformation of flexible matrix composite membranes under internal pressure and axial force. Compos. Sci. Technol. 66(15), 3053-3063 (2006).
Z. Huan, G. D. Jordaan, Investigation of the cooling of spin-casting moulds, Appl. Therm. Eng. 23(1), 17-27 (2003).
International Search Report of PCT/162017/051988 dated Jul. 26, 2017.
Written Opinion of the International Search Authority for PCT/IB2017/051988 dated Jul. 26, 2017.

\* cited by examiner

VARIABLE STIFFNESS DEVICE AND METHOD OF MANUFACTURING THE SAME

FIELD OF THE INVENTION

The present invention is directed to systems and devices having adaptable stiffness, more particularly actuators that can be switched between a rigid state and a soft state, methods of operating the same, and methods of manufacturing the same.

BACKGROUND ART

In the quest of making robots more pervasive in our society, soft technologies are a promising answer to the limitations of traditional robotic systems. State of the art robots are mostly composed of rigid structures and actuators, enabling precise, powerful and specialized motions at the expense of adaptability and safe interaction with the environment and with human operators. Soft technologies shift this paradigm enabling the development of structures, actuators and robots suited for operating in unstructured environments, in proximity to users and for tasks requiring high dexterity or conformability such as manipulation, locomotion, rehabilitation and surgical operations.

Although intrinsic compliance is the core advantage of soft technologies, it can easily become a limiting factor in their usability and versatility. Many tasks require exerting or withstanding substantial forces, which is not trivial for inherently soft systems. For example soft endoscopes can advance through tortuous paths in the human body minimizing pain and damage to the surrounding tissues, but stiffness is mandatory to perform surgical operations. Similarly, manipulation requires compliance for grasping complex shapes as well as rigidity for lifting. Another challenge of soft technologies is the control of a high number of degrees of freedom. The traditional approach consists in using a single actuator for each degree of freedom (DOF), with the drawback of making the system inherently complex and bulky, therefore difficult to miniaturize.

Materials with controllable stiffness have been applied to soft structures in order to selectively tune their load bearing capabilities depending on the task, or to enhance their controllability by selectively stiffening or locking DOF achieving complex configurations and motion patterns with a reduced number of actuators. Some well-known solutions include shape memory polymers (SMP), wax, and electro rheological (ER) and magneto rheological (MR) fluids, which can change stiffness under certain stimuli such as temperature, electric, or magnetic fields.

Accordingly, despite all the advancements in the field of materials with controllable stiffness, in light of the above-described drawbacks and deficiencies of the existing solutions for actuators, strongly improved solutions and methods are desired, with the possibility to switch between soft and rigid states of the actuators.

SUMMARY

According to one aspect of the present invention, a variable stiffness device is provided. Preferably, the variable stiffness device includes a core including a low melting point alloy, an encapsulation surrounding the core, the encapsulation made of an elastic material and sealing the core, and a heating device arranged around the encapsulation, configured to heat the core. Moreover, the elastic material of the encapsulation is subject to a tensile stress in a direction along a longitudinal extension of the thread-like variable stiffness device.

According to another aspect of the present invention, a method of manufacturing a variable stiffness device is provided. Preferably, the method includes the steps of heating a low melting point alloy to put the low melting point alloy in a liquid state, pulling the low melting point alloy in the liquid state inside a longitudinal tubular elastic encapsulation by a suction force, and cooling the low melting point alloy inside the elastic encapsulation to put the low melting point alloy in a solid state. Moreover, the method further preferably includes the steps of applying a tensile force to the elastic encapsulation to stretch the elastic encapsulation tube in a longitudinal direction by a certain percentage, and sealing both ends of the elastic encapsulation in a stretched state to seal the low melting point alloy inside the elastic encapsulation.

According to still another aspect of the present invention, an actuator is provided. Preferably, the actuator includes a tubular body with an interior chamber, and a plurality of variable stiffness devices, each of the variable stiffness devices including a core including a low melting point alloy, a tubular encapsulation surrounding the core, the encapsulation made of an elastic material and sealing the core, and a heating device arranged around the encapsulation, configured to heat the core. Moreover, the elastic material of the encapsulation is subject to a tensile stress in a direction along a longitudinal extension of the thread-like variable stiffness device preferably the plurality of variable stiffness devices are arranged in parallel and are attached to the tubular body, and are also arranged in parallel with a longitudinal extension of the tubular body.

The above and other objects, features and advantages of the present invention and the manner of realizing them will become more apparent, and the invention itself will best be understood from a study of the following description with reference to the attached drawings showing some preferred embodiments of the invention.

BRIEF DESCRIPTION OF THE SEVERAL VIEWS OF THE DRAWINGS

The accompanying drawings, which are incorporated herein and constitute part of this specification, illustrate the presently preferred embodiments of the invention, and together with the general description given above and the detailed description given below, serve to explain features of the invention.

Herein, identical reference numerals are used, where possible, to designate identical elements that are common to the figures. Also, the images are simplified for illustration purposes and may not be depicted to scale.

BRIEF DESCRIPTION OF THE SEVERAL EMBODIMENTS

Figure 1A:
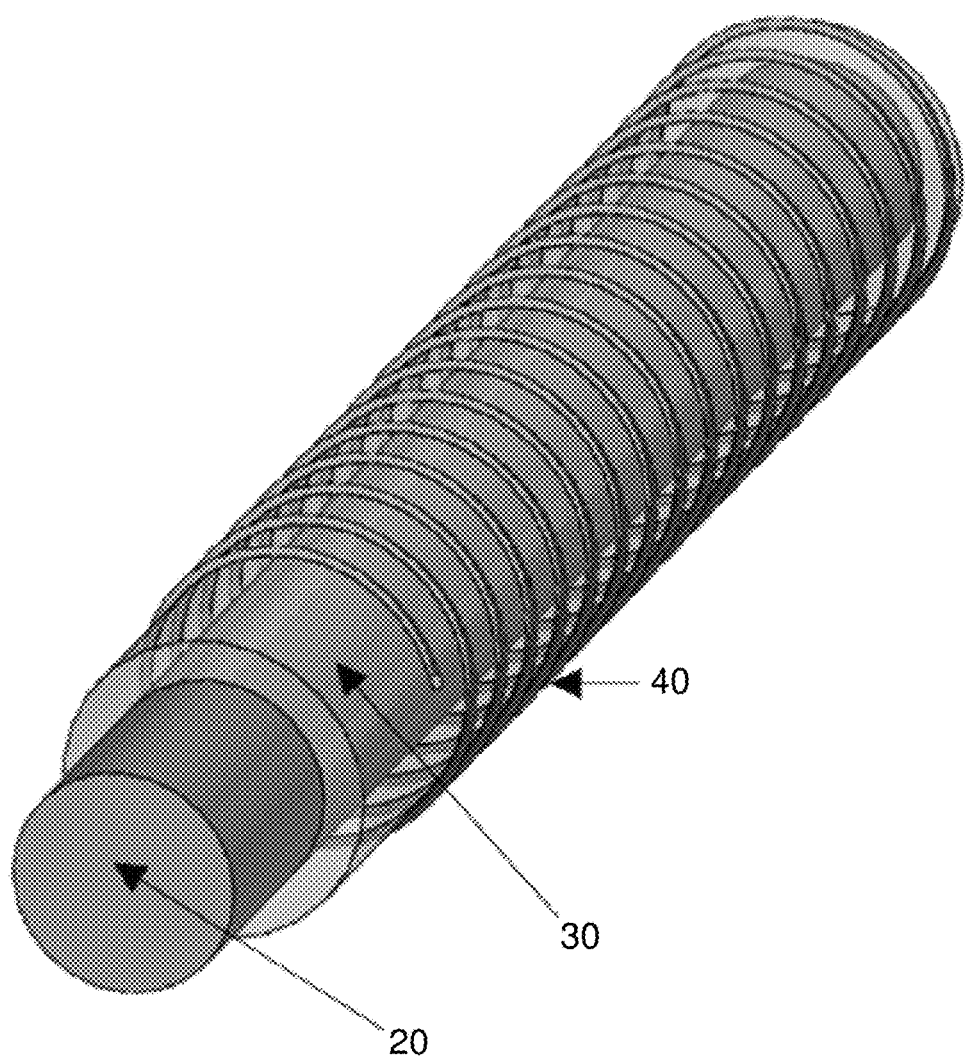
FIGS. 1A-1D show aspects of the variable stiffness device, with FIG. 1A showing schematic perspective view of a variable stiffness device along, according to one aspect of the present invention, FIG. 1B showing a schematic perspective view of the variable stiffness device in a stiff state and in a soft state, connected to a power supply, FIG. 1C showing a cross-sectional view of a variable stiffness device and a variable stiffness device as a thread wound around a spool, and FIG. 1D showing a schematic side view of two variable stiffness devices being subject to a pulling force with a weight, one being in the stiff state and one being in the soft state.

FIG. 1A shows an embodiment of the present invention, showing a device as a longitudinally extended variable stiffness thread or filament (VST) 10 including a core 20 made of low melting point alloy (LMPA), a longitudinal tubular encapsulation 30 made of silicone rubber or another type of elastic and temperature-resistant elastic material, and a heating device 40 made of conductive wire helically wound around an outer surface of encapsulation 30. In the variant shown, encapsulation 30 is a silicon tube. The heating device is formed as a joule heater that is arranged external to core 20 having the purpose of melting the LMPA of core 20, in the variant shown a wire or filament 40 having a circular cross-section helically wrapped around the silicone rubber layer of the encapsulation 30.

In other variants, heating device 40 can be made of a planar conductor, such as a planar wire, to cover more surface of the encapsulation 30, and can be made from different materials, for example a flexible yet conductive material, for example a flexible conductive polymer or rubber. Also, it is possible that wire is embedded into side walls of encapsulation 30, and are not wound around the outer surface of the side walls. Wire of heating device 40 that can provide for heat can itself be coated with a material that provides for electric insulation, but has good thermal conductivity, so that wires of heating device 40 can touch each other, for example, heating device 40 can be a woven mesh of electrically insulated wires to prevent short circuits between individual wires. Furthermore, heating device 40 can be a conductive coating that coats the outer walls of encapsulation 30 having a certain ohmic resistance, the conductive coating having terminals at both ends of the VST 10 to connect to power supply. The LMPA of core 20 can be heated by applying a voltage to the conductive wire of heating device 40, to increate the temperature of core 20 made of LMPA by joule heating, via the thermally conductive tubular encapsulation 30. Next, when the LMPA melting temperature is reached, for example but not limited to 62° C., core 20 transitions from a solid state to a liquid state.

Therefore, the VST 10 has two states, a stiff state where material of core 20 is in a solid state, and a soft state one where material of core 20 is a liquid state. In the soft state, tVST 10 exhibits large strain and low stiffness. This feature permits deformation and shaping of the VST 10 with a large degree of freedom. For example, VST 10 can be woven, just like a silicon tube that serves as the tubular encapsulation 30 that would be filled with a liquid, as the core 20 is in a liquid state. When VST 10 is integrated or built into another soft body, the VST 10 can deform, squeeze, and compress with little effect on the mechanical properties of the whole structure formed by VST 10 and the additional soft body. In the stiff state, VST 10 behaves like a thin metal wire, similar to a tubular encapsulation 30 around a metal wire having the same stiffness as the LMPA in a solid state.

The proposed VST 10 possesses high load bearing performances when in the stiff state and easy deformability and self-healing capabilities when in the soft state. The surprising and unexpected characteristics of self-healing in the soft state when core 20 is liquid is due to the fact that encapsulation 30 is subject to a tensile stress that has been achieved by pre-stretching encapsulation 30 from an un-stretched state, that in turn provides for a compressive stress to core 20 and an internal pressure p to material of core 20. Also, the VST 10 demonstrates variations of the Young's modulus between the stiff and soft state that are in the order of >700.

In the stiff state, the VST 10 can be bent and shaped as long as applied forces do not cause the failure of the LMPA. The proposed VST 10 has a high length to cross-section ratio, such that VST 10 exhibits two main failure modes: if stretched, VST 10 fails when the ultimate tensile strength of the LMPA material of core 20 is reached, while, if compressed, failure is caused by buckling.

Figure 1B:
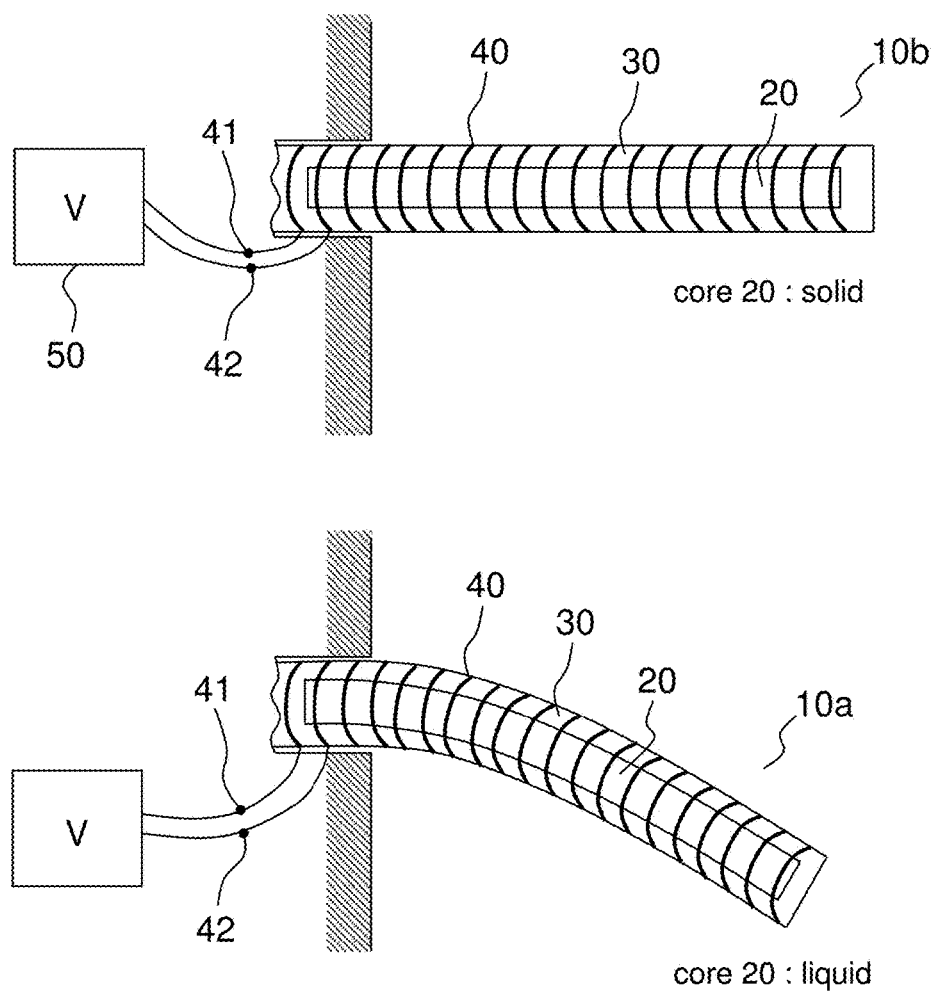

For example, as shown in FIG. 1B, the VST 10 can be made as a thread having a length that is substantially longer that its thickness, for example a thickness of less than 3 mm, and a length of dozens of centimeters. In a variant, the VST can have a length of several meters. Moreover, a power supply 50 is shown that is connected to terminals 41 and 42 of the VST 10. When the power supply is deactivated, core 20 is solid and VST 10 is in a stiff state 10b where the VST 10 can linearly extend along its longitudinal axis, and is not deformable. This means that with VST 10 as described herein, it is possible to maintain a stiff state with no power supply or any other type of activation needed. When the power supply 50 is activated, a current is provided to wire 40 to heat the core 20 to heat the core above a critical temperature, and thereafter, core 20 becomes liquid so that the VST 10 is in a soft state, where it is bend downwardly due to gravity.

Figure 1C:
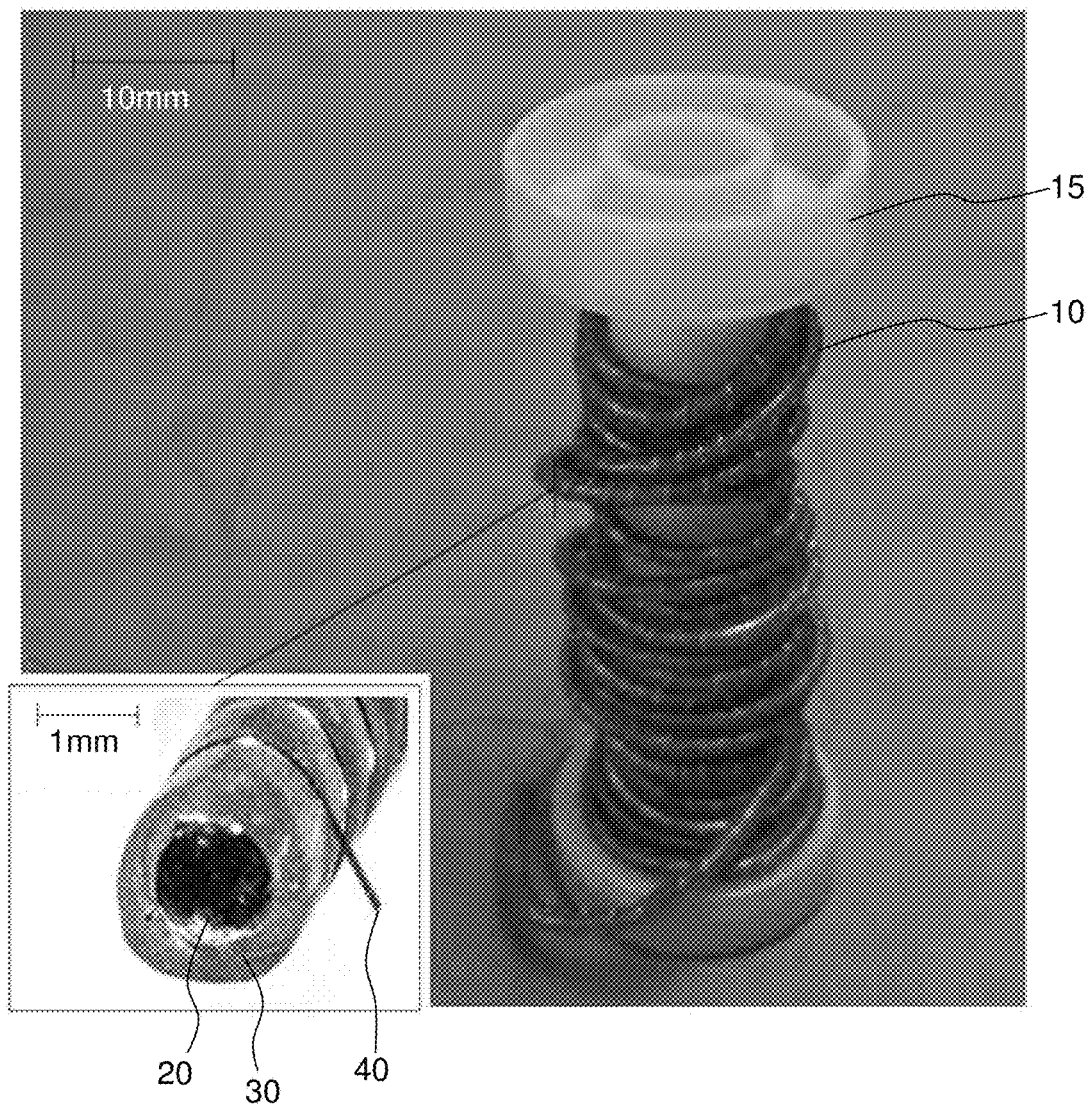

FIG. 1C shows a cross-sectional view of a VST 10 having a diameter of less than 2 mm with a core diameter of 1 mm, and the VST 10 that was wound around a spool 15 while it was in a liquid state, showing the possibility to bend VST 10 to small bending radii. This feature allows to use the VST 10, when manufactured with a small diameter as compared to the length, as a thread for knitted or woven actuators, the length of VST 10 can be several meters.

Figure 1D:
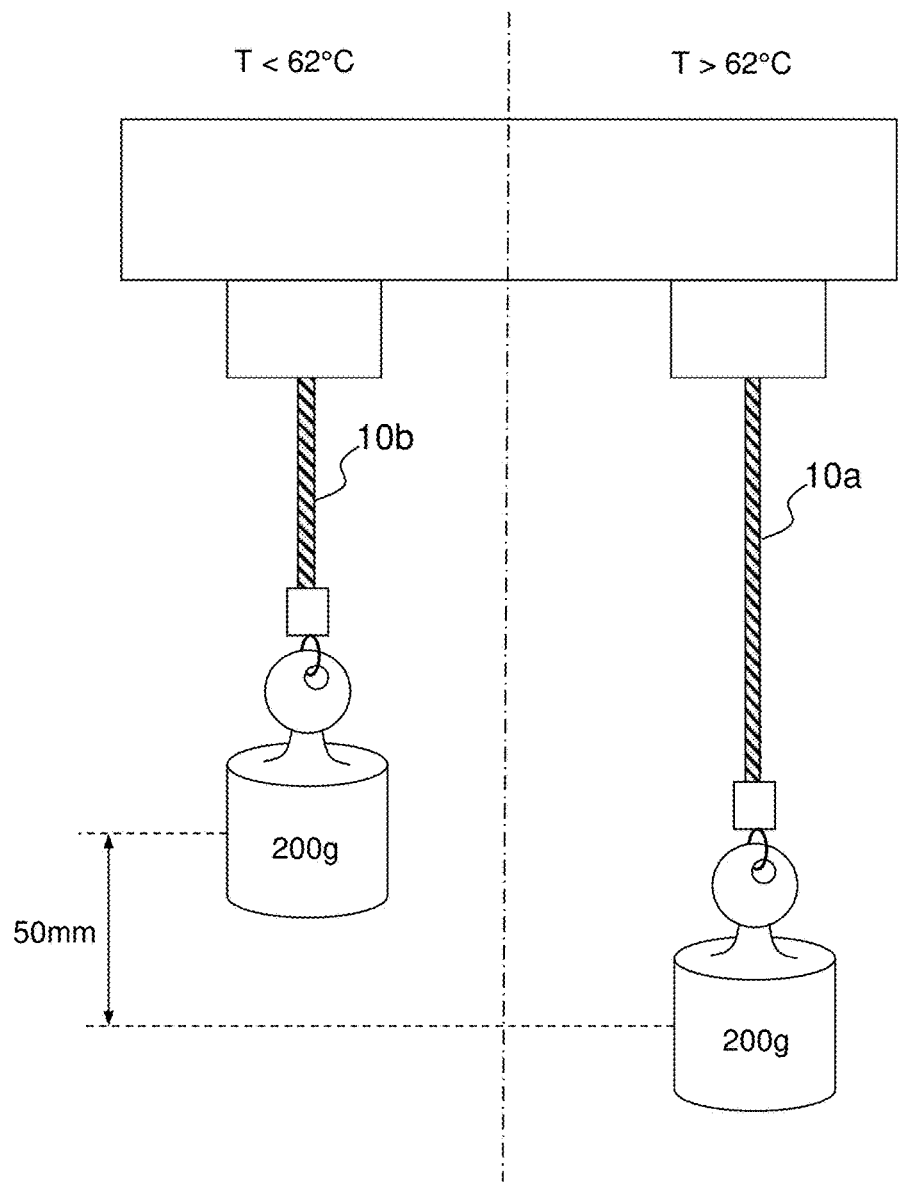

Next, in FIG. 1D, VST 10 is shown in a stiff state with reference 10b and in a soft state with reference 10a. In the soft state, a weight is shown as a load, exemplarily being 200 g, that can stretch the VST 10 by a certain amount, while in the stiff state, the VST 10 remains in its resting length and sustains the load. In the variant shown, the soft state is achieved with a temperature of more than 62° C., while the stiff state is achieved with temperatures below 62° C.

The VST 10 described herein has several important advantages over the background art solutions. With the use of LMPA as a phase change material to form a VST 10, the characteristics of the LMPA can be used to switch core 20 of VST 10 to a liquid state at relatively low temperatures, preferably in a range between 45° C. to 62° C. depending on the alloy composition, and can be used to switch core 20 back to solid state below this temperature threshold. This temperature range is only slightly higher that typical ambient temperatures, i.e. 20° C. to 35° C. The phase change of core 20 is reversible and scalable, as it does not loose efficiency in smaller sizes. Moreover, LMPA used for core 20 in the solid state has a high stiffness, above 3 GPa for example when Field Metal™ 3250-1 from the company HiTech Alloys, Washington State, U.S.A., is used. This stiffness value is several times higher than all the stiffness values of any of the background art materials. Thus, this characteristic plays a fundamental structural role by withstanding forces and controlling DOFs.

To enable melting of the LMPA of core 20, external or direct heating of the alloy can be used and no constant energy input is needed to maintain the load bearing state, in contrast to background art solutions that are based on ER and MR fluids. Furthermore, LMPA has a thermal conductivity one or more orders of magnitude higher than wax and SMP, which translates into a shorter time for changing phase, once the phase change is initiated. Moreover, LMPA does not loose functionality over time, and is fully reversible over very long periods of time and countless usage cycles, unlike solutions based on rheological fluids.

Figure 2A:
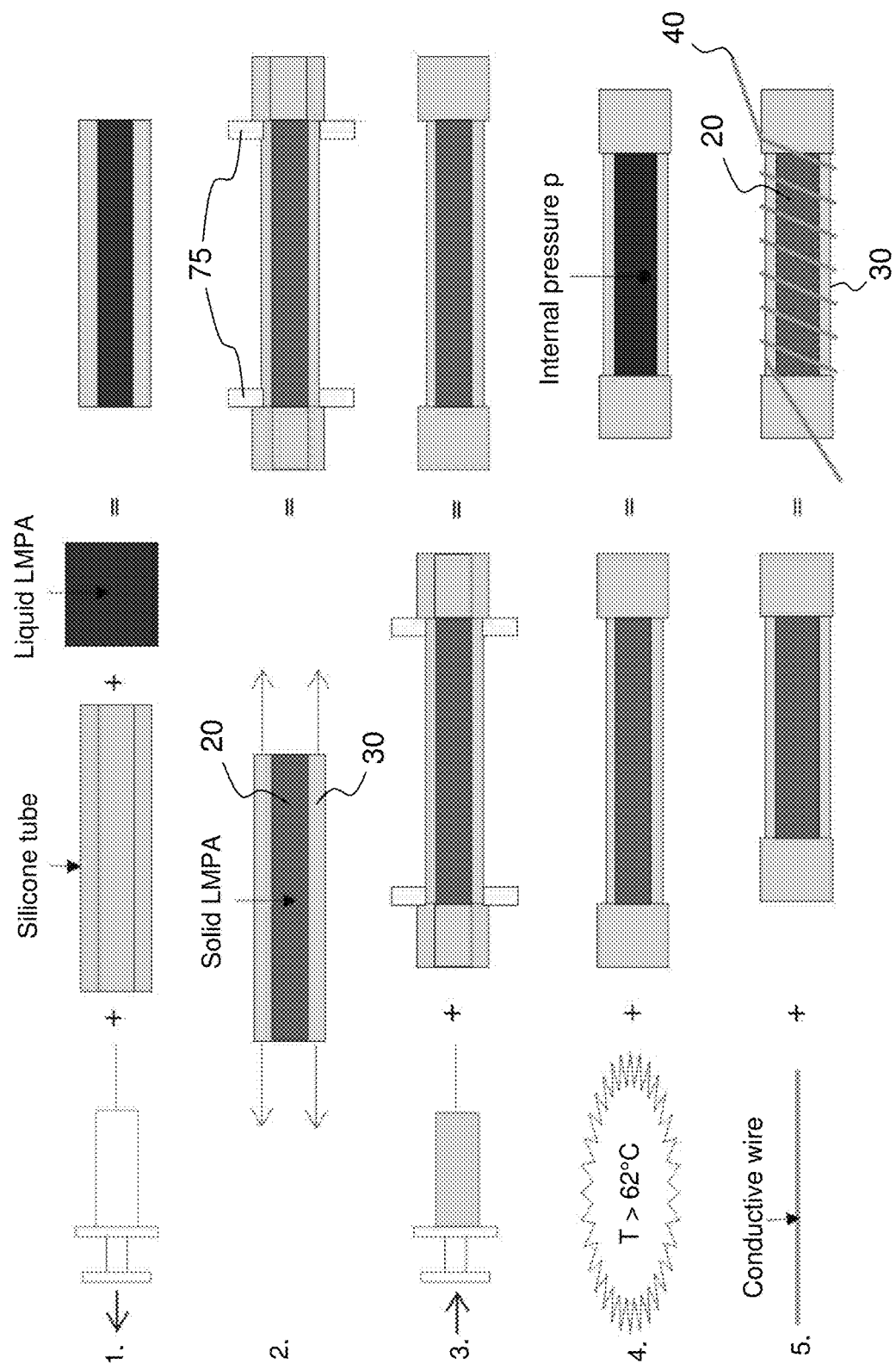
FIGS. 2A-2B show schematic representations of different stages in a method of manufacturing the variable stiffness device, according to another aspect of the present invention.
Figure 2B:
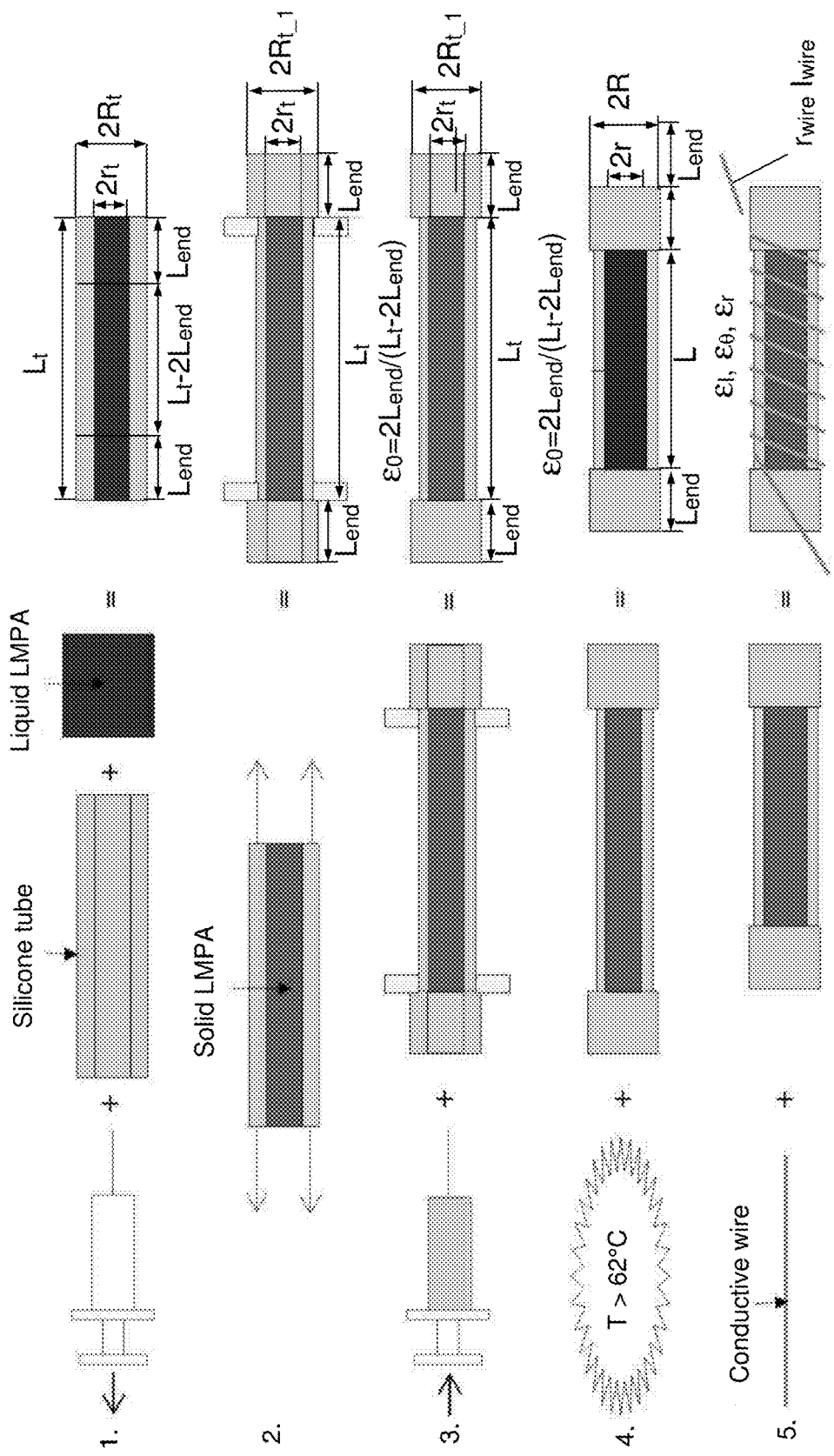

Also, according to another aspect of the present invention, the present VST 10 can be manufactured by a scalable, simple, and inexpensive manufacturing process or method, as shown in FIGS. 2A-2B. For example, VST 10 can be easily fabricated by starting from a block of material that will be used for core 20 made of LMPA, and commercial silicone tubes as encapsulation 30 that are put over core 20, through a process which involves low technology tools such as but not limited to syringe, heated plate, heated and pressurized chamber, clamps. The silicone tube serves as encapsulation 30 for core 20 made of LMPA. FIG. 2B shows the model of the fabrication process where the fundamental parameters for the fabrication process are highlighted.

During the fabrication process or method, in a step 1, a certain amount of LMPA is put into a liquid state and is pressurized, for example an amount that is larger than the volume of the inner tube formed by encapsulation 30. This can be done by the use of a combined heating and pressurized chamber. With this pressurization, the LMPA material is subject to slight compression. Next, by using a suction force, the LMPA material in a liquid state is sucked into an inner tube of encapsulation 30. This can be done within the heating and pressurized chamber, by the use of suction at one opening of encapsulation 30 and a syringe. In a variant, the LMPA can be directly injected into encapsulation with a syringe, or a suction pump can create suction at one end of encapsulation 30 while the other end is dipped into liquid LMPA. In a case where an inner diameter of encapsulation is sufficiently small, preferably less than 1 mm, additional capillary force will aid in distributing the liquid LMPA inside encapsulation 30. The LMPA that is inside encapsulation 30 forms the core 20.

Next, the encapsulation 30 and core 20 is cooled off, for example by removing it from the heating chamber, so that core 20 transitions to a solid state. Next, in a step 2, encapsulation 30 is pre-stretched by subjecting it to a tensile force to stretch encapsulation in a direction along the longitudinal extension of encapsulation 30. This can be done by circular clamps 75 that are arranged around both end portions of encapsulation. The pre-stretch is done to stretch encapsulation 30 from an un-stretched state and not being subject to any tensile forces to a pre-stretched state that can be defined by a percentage of length increase. The pre-stretch of encapsulation leads to a tensile stress in the material of encapsulation in a direction along a longitudinal extension of VST 10, and this tensile stress causes a compressive stress in an opposite direction along a longitudinal extension of VST 10 inside core 20. This compressive stress can be characterized by an internal pressure p that is generated in core 20. Thereby, LMPA material of core 20 is subject to compressive stress. Thereafter, in a step 3, the ends of encapsulation are sealed in the pre-stretched state, and the clamps 75 are removed thereafter.

The application of a tensile stress to encapsulation, and the resulting internal pressure p to core is critical for the self-healing properties of VST 10. Preferably, the percentage of the length increase of encapsulation 30 that surrounds core 20 is in a percentage range approximately between 10% to 100%, and for the exemplary VST 10, this lead to an internal pressure p at core 20 in a range approximately between 0.05 MPa and 0.6 MPa. More preferably, the percentage of the length increase of encapsulation 30 that surrounds core 20 is in a percentage range approximately between 25% to 70%, and for the exemplary VST 10, this lead to an internal pressure p at core 20 in a range approximately between 0.1 MPa and 0.5 MPa.

Next, in a step 4, the encapsulation 30 and core 20 that is now hermetically sealed within encapsulation, is re-heated, so that core 20 is in a liquid state. With the pre-stretched encapsulation, the liquid core 20 is now pressurized by the walls of encapsulation 30. This feature can be used for preserving the integrity of core 20, so that in a liquid state, core 20 is pressured and maintained to be a contiguous structure, with an internal pressure p. This structure provides for self-healing feature of VST 10, once core 20 is ruptured in a solid state 20. Thereafter, in a step 5, encapsulation 30 and core 20 can be cooled down, so that VST 10 is in a final shape, before the heating device 40 is installed, i.e. the conductive wire 40 is wound around encapsulation 30. The dimensions of VST 10 as an end product and internal pressure p in the liquid state of core 20 can be determined as a function of the geometry, and the elastic properties of the imposed pre-stretching of the silicone tube that forms the encapsulation 30, and influences the overall mechanical properties and self-healing capabilities of VST 10.

With FIG. 2B, the modelling of the manufacturing method of the VST 10 is described. At the end of step 1 of the manufacturing method, encapsulation 30 is not stretched, length $L_t$ and internal radius $r_t$ correspond to the length and external radius of core 20 in a solid state. A longitudinal initial strain ε0 is then imposed on encapsulation 30 as shown in step 2 with the two ends at length Lend are left un-deformed or un-stretched in order to be used as sealing caps 35 by adding additional elastic material to both ends of encapsulation 30. ε0 can be expressed as follows:

$$\varepsilon_0 = \frac{2 \cdot L_{end}}{L_t - 2 \cdot L_{end}} \quad (1)$$

After melting the LMPA of core 20, the resulting VST 10 varies its dimension according to the elastic restoring force of the silicone tube used and the presence of liquid LMPA. By considering both the material of encapsulation 30, for example silicone, and LMPA incompressible, it is possible to relate the final external radius R and internal radius r to the initial dimensions of silicone tube ($r_t$, $R_t$, $L_t$, $L_{end}$):

$$r = \sqrt{\frac{r_t^2 \cdot L_t}{L}} \quad (2)$$

$$R = \sqrt{\frac{R_{t\_1}^2 \cdot L_t}{L}} \quad (3)$$

Where $R_{t\_1}$ is the external radius of encapsulation 30 after pre-stretching and before melting.

$$R_{t\_1} = \sqrt{\frac{R_t^2 \cdot (L_t - 2 \cdot L_{end}) + 2 \cdot L_{end} \cdot r_t^2}{L_t}} \quad (4)$$

In order to estimate the final length L as a function of initial geometry, VST 10 after melting core 20 is considered as a thin wall pressure vessel, with length L, internal radius r and external radius R. Radial stress is the result of the pressure acting on silicone walls of encapsulation 30:

$$\sigma_r = -p \quad (5)$$

Stresses in longitudinal and circumferential directions are assumed to be uniform across the wall and throughout the vessel. They can be calculated as follows:

$$\sigma_l = \frac{p \cdot \beta^2}{1 - \beta^2} \quad (6)$$

$$\sigma_\theta = p \cdot \frac{(1 + \beta^2)}{1 - \beta^2} \quad (7)$$

in which:

$$\beta = \frac{r}{R} \quad (8)$$

According to linear elasticity theory for continuous isotropic media, the deformation in the circumferential and longitudinal directions, respectively εθ and εl, can be expressed as:

$$\varepsilon_\theta = \frac{r - r_t}{r_t} = \frac{1}{E_{SIL}} \cdot (\sigma_\theta - v \cdot \sigma_l - v \cdot \sigma_r) \quad (9)$$

$$\varepsilon_l = \frac{L - (L_t - 2 \cdot L_{end})}{(L_t - 2 \cdot L_{end})} = \frac{1}{E_{SIL}} \cdot (\sigma_l - v \cdot \sigma_\theta - v \cdot \sigma_r) \quad (10)$$

where v is the Poisson ratio for incompressible materials (v=0.5) and $E_{SIL}$ the Young's modulus of silicone.

By substituting Equations (5), (6) and (7) into expressions (9) and (10) we obtain the internal pressure p and the final length of VST 10 as functions of the initial geometry (rt, Rt, Lt), the initial strain and the elastic properties of the silicone tube. Combining this with Equations 2 and 3 allows the r and R of VST 10 to be found. By inverting the model, it is possible to estimate the required pre-stretching and initial dimensions of encapsulation 30 to be used for obtaining the desired geometry of the VST 10.

The internal pressure p is fundamental for obtaining self-healing ability. The internal pressure p increases for higher pre-stretching imposed during fabrication while, for a given pre-stretching and wall thickness of encapsulation 30, it decreases by increasing the dimensions of core 20. The diameter of core 20, which is particularly important for load bearing, slightly depends on pre-stretching. As predicted by our model, the final length of exemplary VST 10 depend only on the pre-stretching. For example, the final length of VSF pre-stretched of 25% is approximately 80% of the initial length at step 1, irrespective of the initial radial dimension. Moreover, exemplary VST 10 fabricated from encapsulation 30 of silicone tubes with different lengths and same radial dimensions and pre-stretched equally display the same final geometrical characteristics.

As further discussed in detail below, the mechanical performances and self-healing capabilities of the VST 10 are experimentally characterized. Its suitability as a variable stiffness component is demonstrated in three different applications, including but not limited to a single-chamber soft pneumatic actuator, which has multiple degrees of freedom enabled and easily controlled by the selective softening of its VST-based wall partitions, a foldable mobile platform able to perform both terrestrial and aerial locomotion according to the shape of its VST-based body, and wearable solutions for the rehabilitation of injured fingers and other body parts.

Figure 2C:
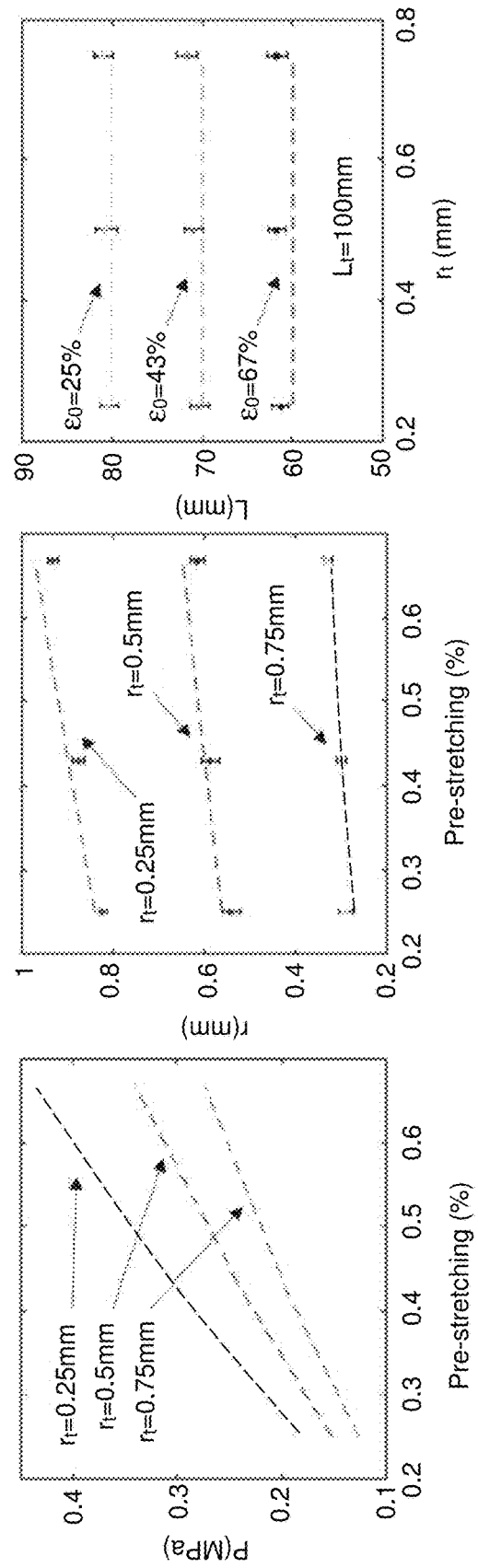
FIG. 2C shows effects of the pre-stretching of the encapsulation of the variable stiffness device during manufacturing.

FIG. 2C show graphs of experimental results from VST 10 obtained from silicone tubes with the same initial length ($L_t$=100 mm), the same wall thickness of encapsulation ($R_t$-$r_t$=0.5 mm) and different initial internal radius of interior tube or chamber of encapsulation 30 ($r_t$=0.25, 0.50, 0.75), during fabrication different pre-stretching percentages were imposed (ε0=25%, 43%, 67%). In the left chart, an internal pressure p of LMPA in a liquid state has been estimated by model by varying pre-stretching ε0 and internal radius rt. In the middle chart, final LMPA radius r, obtained by varying pre-stretching ε0 and internal radius rt; the LMPA core diameters of three VSTs with the same characteristics were measured twice along their length by a caliper with a resolution 0.02 mm, experimental and theoretical results are compared, represented as solid markers and dotted lines, respectively, the error bars are the standard deviation of the mean. In the chart on the right, final length L of the VST samples characterized by the same initial length Lt different initial LMPA radius $r_t$ and pre-stretching ε0; the lengths of three VSTs with the same characteristics were measured by a ruler having a resolution 1 mm, experimental and theoretical results are compared, represented as solid markers and dotted lines, respectively, with the error bars being the standard deviation of the mean.

Figure 3A:
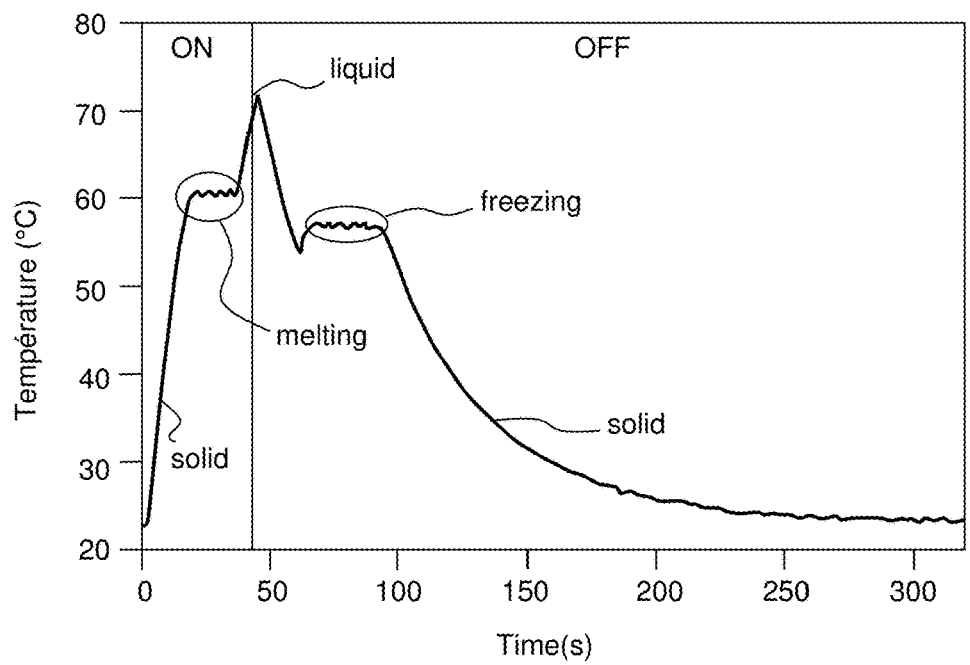
FIG. 3A shows a graph with a timeline of the temperature profile during the melting process and the freezing process, and the shape recovery when the core is liquid.

FIG. 3A shows the surface temperature trend of a VST 10 heated up by Joule heating through heating device 40, in the variant shown a copper conductive wire. When current is provided by power supply 50 to wire 40 at t=0s, temperature increases abruptly up to LMPA melting temperature within a time t=$t_1$ needed for the heat to diffuse through the side walls formed by the encapsulation 30. Thereafter, a constant temperature phase is attained that melts the LMPA material of core 20, as core 20 absorbs the energy in the form of latent heat for the transition from solid state to liquid state. Subsequently, at t=$t_2$, the LMPA material of core 20 is completely liquid and as a consequence thereof, VST 10 is in a soft state. If additional current from power supply 50 is provided to heat wire 40, the temperature rises further. In case the wire 40 is not provided with current anymore, instantaneously the temperature of core 20 with the LMPA material in the liquid phase decreases monotonically to another constant temperature phase where the freezing of the LMPA occur. It can be observed that the freezing threshold temperature is slightly lower that the melting one.

Figure 3B:
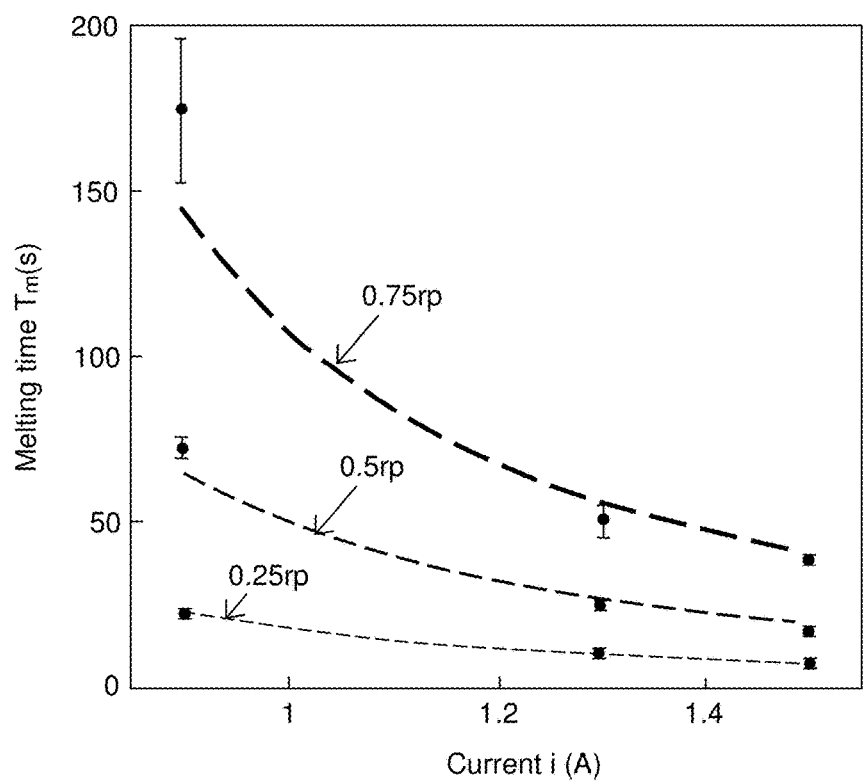
FIG. 3B shows a graph representing the melting times of a variable stiffness device.

In FIG. 3B, for a certain exemplary geometry of an VST 10, graphs are provided that show the time durations that are needed for a core 20 made of LMPA to melt as a function of the current applied to wire 40. It can be seen that a duration required for melting the LMPA, and therefore a time required to switch the VST 10 from stiff state to a soft state, can be decreased by an increased input current supplied to wire 40 by power supply 50. The higher the current the shorter the time needed to reach melting conditions of core 20. The cooling rate is related to the environment with an air flow at room temperature. It can also be seen that thicker cores 20 require more time than thinner cores. Tensile strength was tested with VST 10 fabricated from silicone tubes as encapsulation 30 with constant wall thickness (0.5 mm), characterized by different internal radii ($r_t$=0.25, 0.5, 0.75 mm shown in Table I) and pre-stretching ($ε_0$=25%). To show the difference in terms of self-healing, samples with no pre-stretching were also fabricated. Each VST is identified by an initial radius of core 20 and silicone pre-stretching. For example, series 0.5rp is characterized by an initial internal radius of 0.5 mm and pre-stretched conditions.

Melting times of VST 10 having different internal radii 0.25rp, 0.5rp, 0.75rp, length L=10 mm of encapsulation 30, heated up by providing constant current i=0.9, 1.3, 1.50 A via power supply 50 into the conductive wire as heating device 40 with radius $r_{wire}$=0.05 mm, and a length $l_{wire}$=55 m. The experimental results are compared with the melting temperatures predicted as shown with the dotted lines in the graph. For each input current three (3) tests were performed. The VST 10 were suspended in air at room temperature 23° C., with a convective heat transfer coefficient h=10 Wm$^{-2}$K$^{-1}$ in order to avoid conductive heat losses. The values used for the predictions are taken from literature or they are estimations based on similar materials, the latent heat is assumed equal to the Wood's metal one (cl=39980 J Kg$^{-1}$), as previously done in while specific heat c=184 J Kg$^{-1}$ K$^{-1}$. The table below shows the radial dimensions of exemplary VST 10 fabricated with ε0=25% pre-stretching. The rt and Rt are the internal and external radii of the silicone pipes used for the fabrication. r is the radius of core 20 of VST 10. R is the total external radius of the exemplary VSF 10. The diameters of VSFT 10 were measured by a caliper having a resolution 0.02 mm.

TABLE I

| Series: | $r_t$ (mm) | $R_t$ (mm) | r (mm) | R (mm) |
| --- | --- | --- | --- | --- |
| 0.25rp | 0.25 | 0.75 | 0.58 ± 0.015(SD) | 0.76 ± 0.01(SD) |
| 0.5rp | 0.5 | 1 | 0.54 ± 0.01(SD) | 1.03 ± 0.01(SD) |
| 0.75rp | 0.75 | 1.25 | 0.82 ± 0.005(SD) | 1.30 ± 0.01(SD) |

Figure 4A:
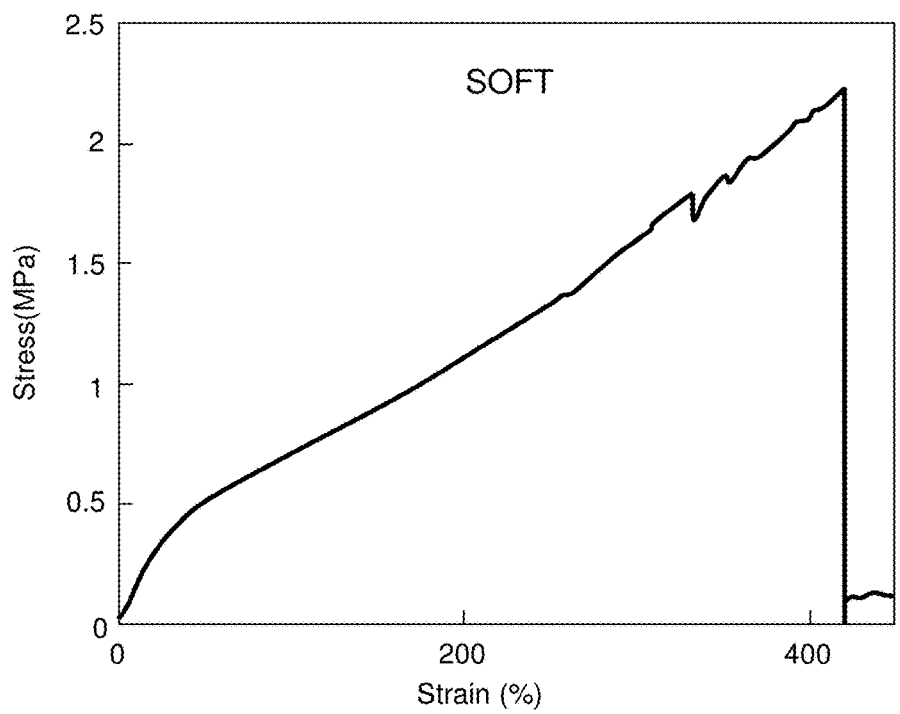
FIG. 4A shows a graph representing the stress as a function of the strain applied to a variable stiffness device in the soft state.

With the chart shown in FIG. 4A, stiffness change of the VST 10 is discussed and quantified. In order to quantify the VST mechanical properties, tensile and compressive tests were performed. In the soft state, core 20 of LMPA is liquid and the VST 10 is able to deform up to 400%, which is slightly less than the max elongation that encapsulation 30 of silicone alone could sustain before breaking. This is shown with the sharp drop of the curve at >400%. The corresponding tensile strength is 2.13±0.50 (SD) MPa. The behavior of all exemplary VST 10 in the soft state were found to be linear up to 20% strain, as shown in the graph. Moreover, the deformation rate influences only slightly the VST stress performances during elongation. Example of stress strain curves for an exemplary VST 10 with an initial internal radius of 0.5 mm of encapsulation 30 and a pre-stretch percentage of 25% of longitudinal expansion from the non-stretched encapsulation 30.

Figure 4B:
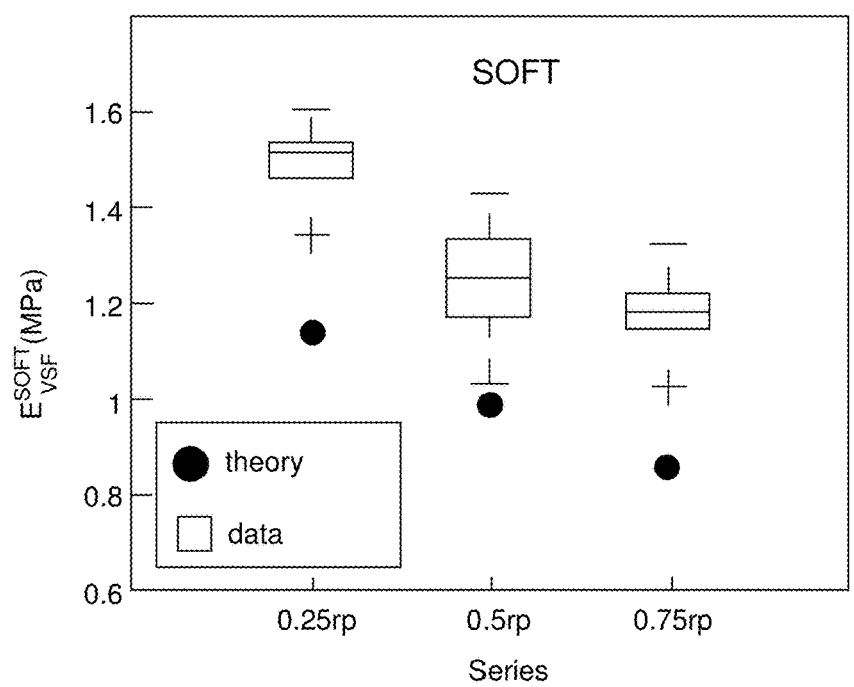
FIG. 4B shows a graph representing Young moduli of variable stiffness devices with constant thicknesses of walls of the encapsulation and increasing diameters.

FIG. 4B show a chart representing Young's moduli of VSTs in the soft state, with a series having different initial internal radii 0.25rp, 0.5rp, and 0.75rp of encapsulation 30 but with the same thickness of walls of encapsulation 30 are characterized by Young moduli $E_{SOFT}$ slightly decreasing from 1.5 to 1.1 MPa. The Young moduli were calculated from the previously described stress strain curves in correspondence of the linear portion of the graph, by considering the total cross sectional area of the VST.

Figure 5:
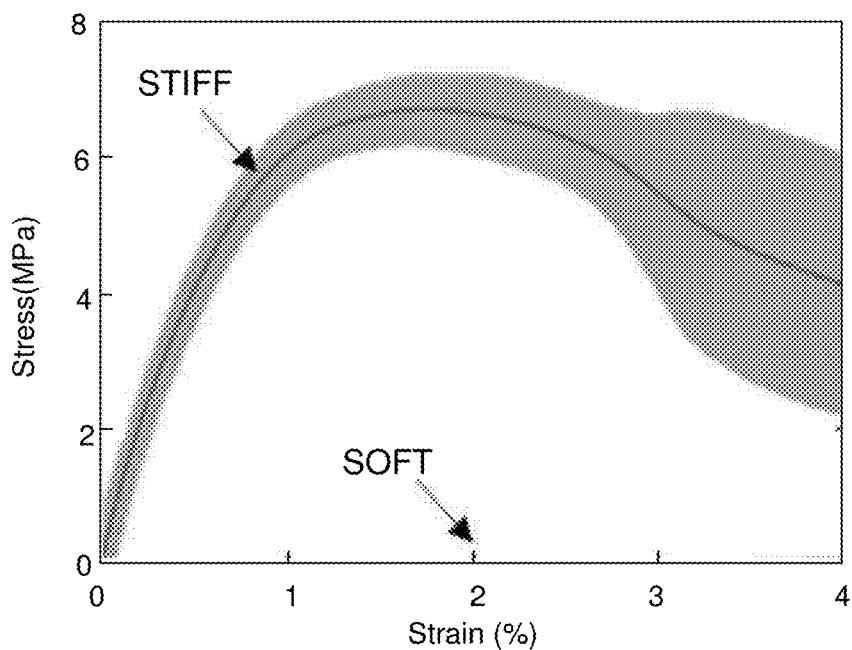
FIG. 5 shows a graph representing stress as a function of strain applied to an exemplary variable stiffness device in the stiff and in the soft state.

Next, fracturing of exemplary VST 10 is characterized with FIG. 5. If stretched when in the stiff state, VST 10 exhibit high ductile fracture in which core 20 necks down to a point. After the initial necking, core 20 is not in contact with inner walls of encapsulation anymore. Cavities into the LMPA material of core 20 arise and coalesce, the resulting crack moves slowly, with a large amount of plastic deformation before fracture occurs, as shown in FIG. 5, representing results of stress strain curves for exemplary VST 10 with 0.5rp for both the soft state and the stiff state. The VST 10 reaches its ultimate tensile strength when core 20 necks, and this happens for strains that range from 1% to 3%.

During this axial deformation core 20 and encapsulation 30 detach from each other, and for this reason, the model cannot describe properly the observed behavior of the exemplary VST 10.

If stretched when in the stiff state, VST 10 exhibit ductile failure where core 20 of LMPA necks down before fracture. VST 10 reaches the ultimate tensile strength 6.89±0.39 (SD) MPa when core 20 necks, for a corresponding deformation of 1.83%±0.20 (SD). The resulting Young's modulus $E_{VSF\_stiff}$=887.79±55.69 (SD) MPa is more than 700 times higher than in soft state. This very large variation of the Young's modulus of VST 10 is surprising and unexpected in light of the substantially smaller variations of the Young's modulus with background art variable stiffness devices. Core 20 of LMPA plays the main role in sustaining the imposed deformation when solid, while encapsulation 30 made of silicon has a negligible contribution to the overall performance. Indeed, when the mechanical properties are calculated by considering the initial cross sectional area $A_{LMPA}$ of core 20, rather than the total cross sectional area $A_{TOT}$ of VST 10, the resulting values of the Young's modulus (3229±202 (SD) MPa), ultimate tensile strength (3229±202 (SD) MPa) and the corresponding deformation (1.83±0.20 (SD) %) are not significantly different with respect to the values measured in the LMPA alone (Wilcoxon rank sum test, p values P=0.40, P=0.63, P=0.40 respectively). These values can be further increased by using a softer material for encapsulation 30, for example a softer type of silicon.

Figure 6:
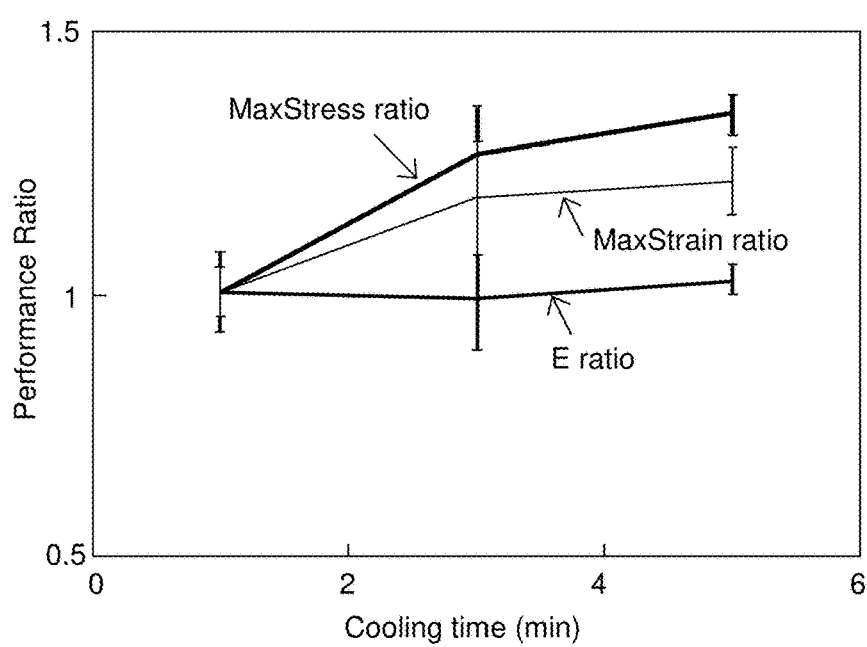
FIG. 6 shows a graph representing mechanical performance including tensile stress, strain, and Young's modulus versus cooling time for a solid variable stiffness device.

With respect to FIG. 6, the graphs show that the mechanical properties in terms of tensile stress and strain of VST 10 are influenced by the cooling time, while the Young's modulus (E ratio) is mostly invariant. The changes in the mechanical properties are described by ratios between their values with exemplary VST 10 that were tested after 1, 3, 5 minutes and 1 minute of convective cooling at room temperature (23° C.). After a cooling time of 1, 3 and 5 minutes, the temperature of the sample was approximately 50° C., 30° C. and 23° C. respectively. For each cooling time three (3) tests were performed. Error bars represent the standard error of the mean ratio.

Figure 7A:
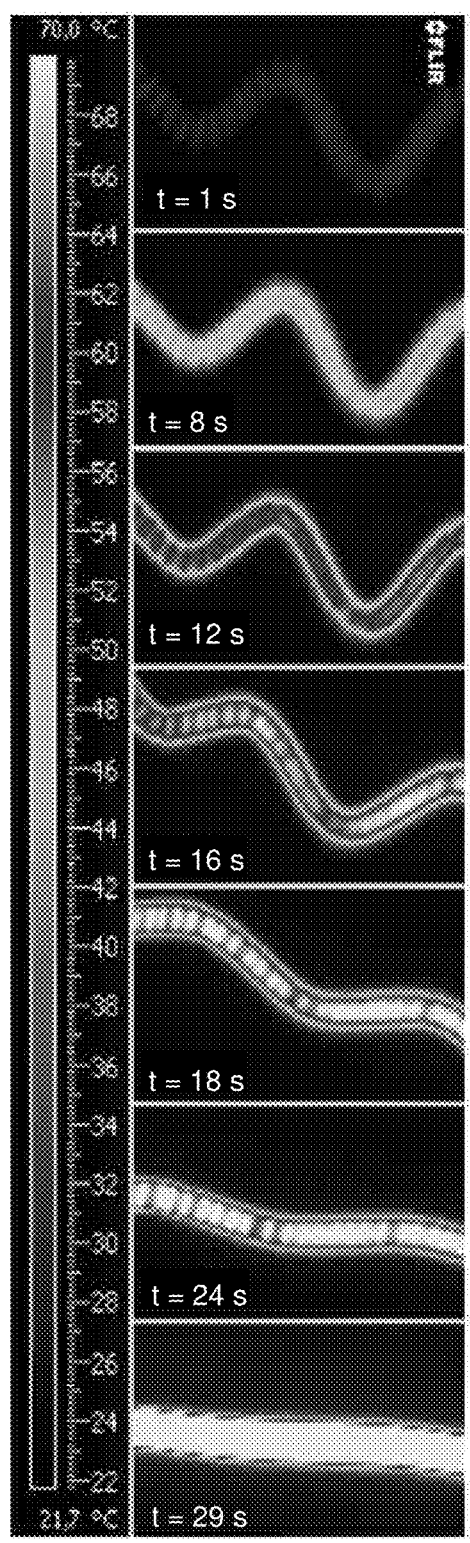
FIG. 7A shows a series of infrared thermal images of an exemplary variable stiffness device that recovers its original straight shape during the transition from stiff to soft state.
Figure 7B:
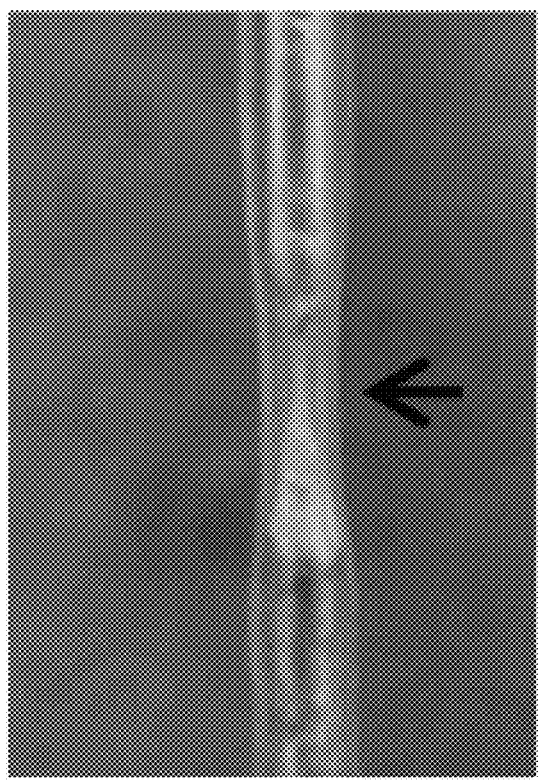
FIG. 7B shows a close-up representation of the ruptures core of a variable stiffness device after applying a tensile force above the critical value.

Next, FIG. 7A show thermal images that represent experimental results that have been performed to characterize shape recovery and self-healing of the VST 10. According to another aspect of the present invention, after extreme deformations, even those causing mechanical failure to core 20 in a solid state, for example by causing ruptures and cracks to core 20 by excessive force, VST 10 can recover into its original shape. The shape recovery of VST 10 can be achieved by a melt-and-freeze cycle in which core 20 is molted and frozen again, and by the elastic restoration force provided by encapsulation 30 that provides for internal pressure p on core 20. Both liquid and solid phase coexist in the LMPA core during melting, and therefore core 20 of VST 10 loses its structural role at the beginning of the melting process, and thereafter can recover its original straight shape. The complete shape recovery takes place when the total volume of core 20 is liquid, at the end of the melting process.

FIG. 7A shows a series of thermal images taken by a thermal imager from FLIR Systems™, Inc. of an exemplary VST 10 that recovers its original straight shape during the transition from stiff to soft state, starting from serpentine-shaped configuration. VST 10 (Series 0.5rp_25%: $r_0$=0.54 mm, $R_{VST}$=1.03 mm, total length $L_0$=130 mm) is heated up by a wire 40 made of copper with a wire radius $r_{wire}$=0.04 mm, wire length $l_{wire}$=600 mm, that is provided with a 1.1 A current from power supply 50. At time t=1 s, it can be seen that core 20 the initially straight VST 10 has a S-shape, in both the solid or stiff state. Power supply is started at t=0s. After approximately 10 s core 20 reaches its melting temperature at 62° C., starting from a room temperature 23.5° C. After the core 20 has reached its melting temperature, core 20 and VST 10 starts to recover its original shape. The complete straightening of VST 10 occurs in t=24-29 s when the melting process is completed, at the end of the constant temperature phase highlighted in FIG. 3A. The experimental results and the have shown that the energy density required for melting core 20 is in a range between 0.4457 J/mm³ to 0.6773 J/mm³.

As mentioned above, once core 20 of VST 10 is broken or fractured, for example by an entire or partial fracture, the original physical dimensions and mechanical performances of VST 10 can be restored by self healing. The two surfaces facing each other of two elements of fractured core 20 are pressed together because of the pre-stretching imposed on encapsulation 30 that has been created during fabrication of VST 10. This effect allows to rejoin the two elements of core 20 through a fusion bonding. The pre-stretching and internal pressure p strongly helps the healing process, as the simple melting and refreezing of core 20 may be insufficient for restoration of the core. Poor wettability between the silicone material used for encapsulation 30 and the liquid LMPA of core 20 can prevent contact between the two liquid surfaces of the two fractured elements of core 20. Self-healing extends the working life of VST 10, this feature may be particularly important because, once integrated in a structure, repair or replacement of core 20 may be difficult, and depending on the application, impossible.

As shown above, the heating of core 20 via encapsulation 30 by use of a wire 40 wound around encapsulation 30 as an external heating process has shown substantial advantages over direct Joule heating of core 20. First, when core 20 of LMPA breaks or fractures, the electrical conductivity through out the VST 10 of a heating device in core 20 is not lost, permitting to initiate a heating process to fractured core 20 thus still permitting self-healing. Second, no direct wiring or provision of other heating elements to core 20 is necessary, so that core 20 made of LMPA material can be completely enclosed by encapsulation. This allows to preserve a mechanical and sealing integrity of encapsulation 30, to prevent air egressing into area formed by core 20, and to prevent material of core 20 in liquid state to escape out of the encapsulation 30 through cavities or gaps formed by wires that lead through encapsulation 30 to core 20.

Figure 8A:
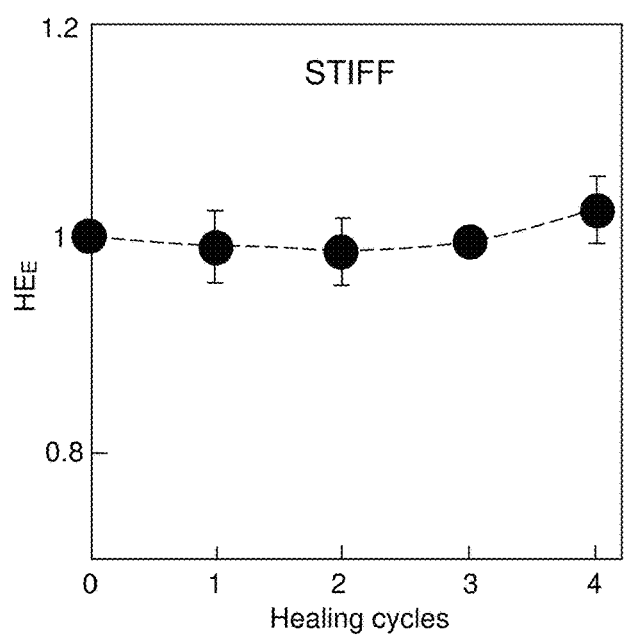
FIGS. 8A-8C show graphs representing healing efficiency indexes related to Young's modulus, tensile stress and elongation at break for pre-stretched variable stiffness devices.

Next, healing efficiency is discussed with respect to FIGS. 8A to 8D. Healing efficiency ratios can be defined for a range of properties as defined by the following equations (11)-(13):

$$HE(\sigma) = \frac{\sigma_{TS,healed}}{\sigma_{TS,initial}} \quad (11)$$

$$HE(\varepsilon) = \frac{\varepsilon_{MAX,healed}}{\varepsilon_{MAX,initial}} \quad (12)$$

$$HE(E) = \frac{E_{STIFF\_healed}}{E_{STIFF}} \quad (13)$$

Where $\sigma_{TS}$, $\varepsilon_{MAX}$, and E are ultimate tensile strength, maximum strain before LMPA breaking and Young's Modulus, respectively. By evaluating these healing efficiency ratios related to tensile tests, it appears that self-healed pre-stretched samples recover their original stiffness and load transferring abilities, as shown in FIG. 8A. Approximately 100% of the initial ultimate tensile stress and ultimate strain were recovered after one or more thermic cycles, see FIGS. 8B and 8C. Interestingly, 80% of consecutive trials ended with a failure in a different location of the sample. FIG. 8D shows the typical performance of a non-pre-stretched sample. After the first failure, the sample tends to break in the same physical location, >90% of consecutive trials, and with decreasing applied stresses and strains. After a certain number of trials, the heating process is not sufficient to guarantee even a partial re-bonding of fractured core surfaces, see cycle 3 in FIG. 8D. The maximum number of consecutive tests before the complete loss of load bearing capability varies, but it is typically less than four (4).

Figure 8B:
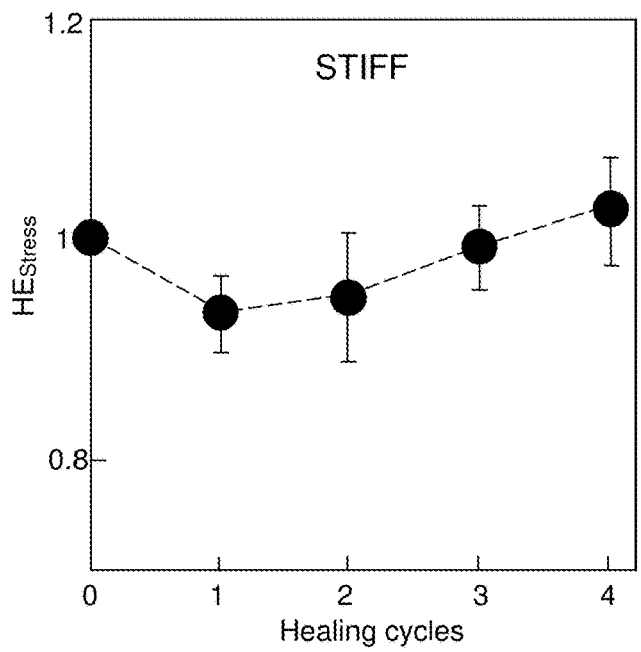
Figure 8C:
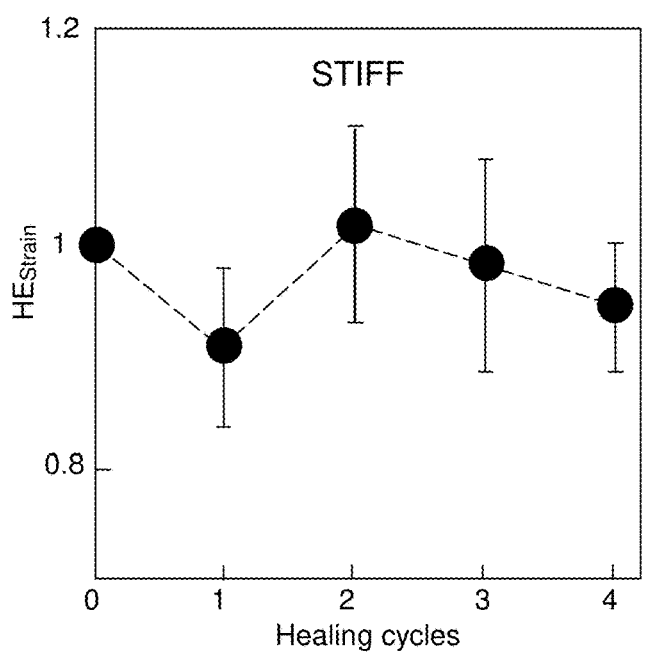
Figure 8D:
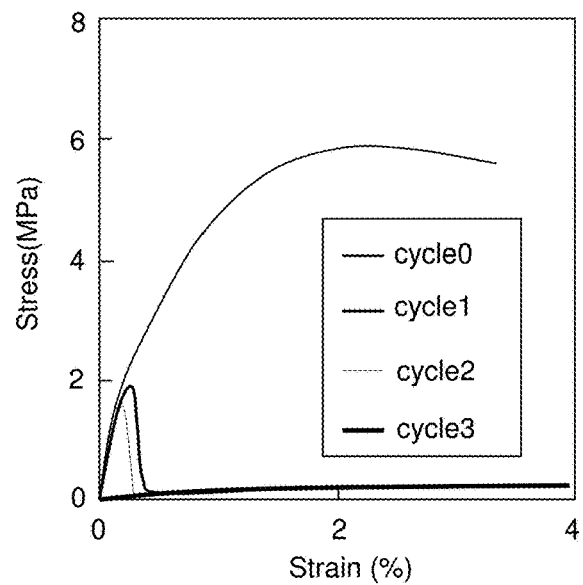
FIG. 8D shows the behavior of a sample not subjected to encapsulation pre-stretch showing a breakdown in stress performance.

In FIGS. 8A-8D, healing efficiency indexes HE are related to Young's modulus (FIG. 8A), tensile stress (FIG. 8B) and elongation at break (FIG. 8C) for pre-stretched samples subjected to consecutive healing cycles belonging to examples of the 0.5rp series (FIG. 8B). Error bars represent the standard error of the mean, and in FIG. 8D, representative series of consecutive stress strain curves performed by a non-pre-stretched sample of 0.5rp.

Figure 9A:
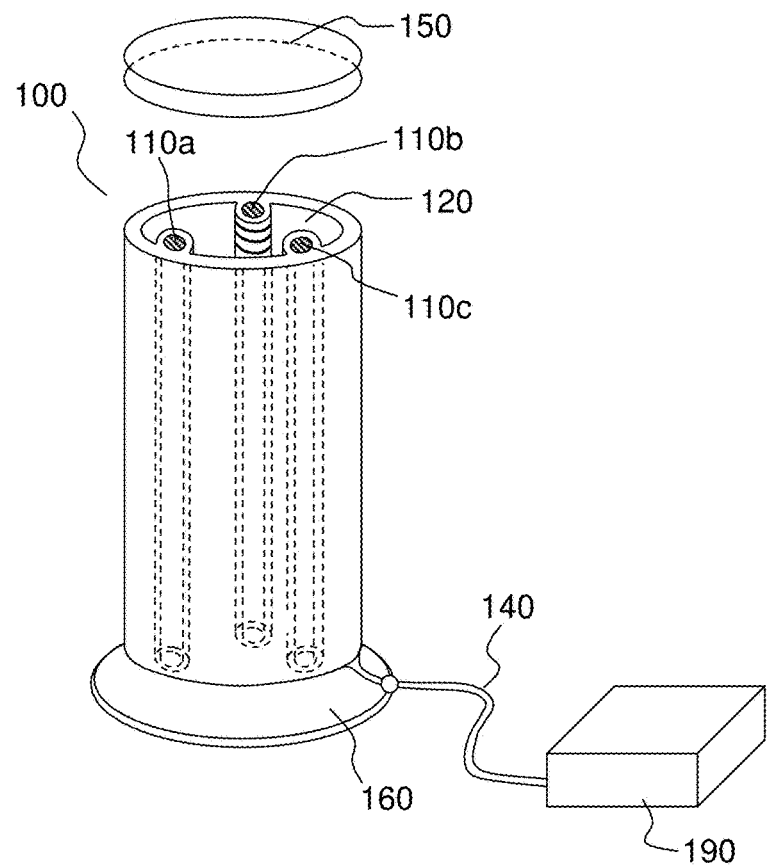
FIG. 9A shows a schematic perspective view of an actuator made of three variable stiffness devices, according to another aspect of the present invention.

Next, according to another aspect of the present invention, different systems and devices are discussed that use one or more VST 10, for example to form different types of actuators. For example, FIG. 9A shows a schematic perspective view of a fluidic actuator 100, that can be used for various applications such as but not limited to process automation, robots, automotive. Fluidic actuator 100 includes a flexible casing having a lid 150, a tubular structure 130 with three (3) VST 110a, 110b, and 110c integrated therein, arranged each spaced equidistant from each other by 120° around a cross-section of tubular structure 130 to be in parallel with each other, and a base 160. Lid 150 is showed to be detached from structure 130, but in a finished embodiment is attached to tubular structure to perform am air-tight and sealed interior chamber 120. A conduit 140 is shown that can provide for the heating wires for VST 110a, 110b, and 110c, and air to inflate and keep a certain air or gas pressure inside interior chamber 120 of actuator 100. A power supply and control unit 190 is used to control stiffness states of VST 110a, 110b, and 110c via conduit 140 that includes several conducting wires, and can also be used to control the air or gas pressure inside chamber 120.

Figure 9B:
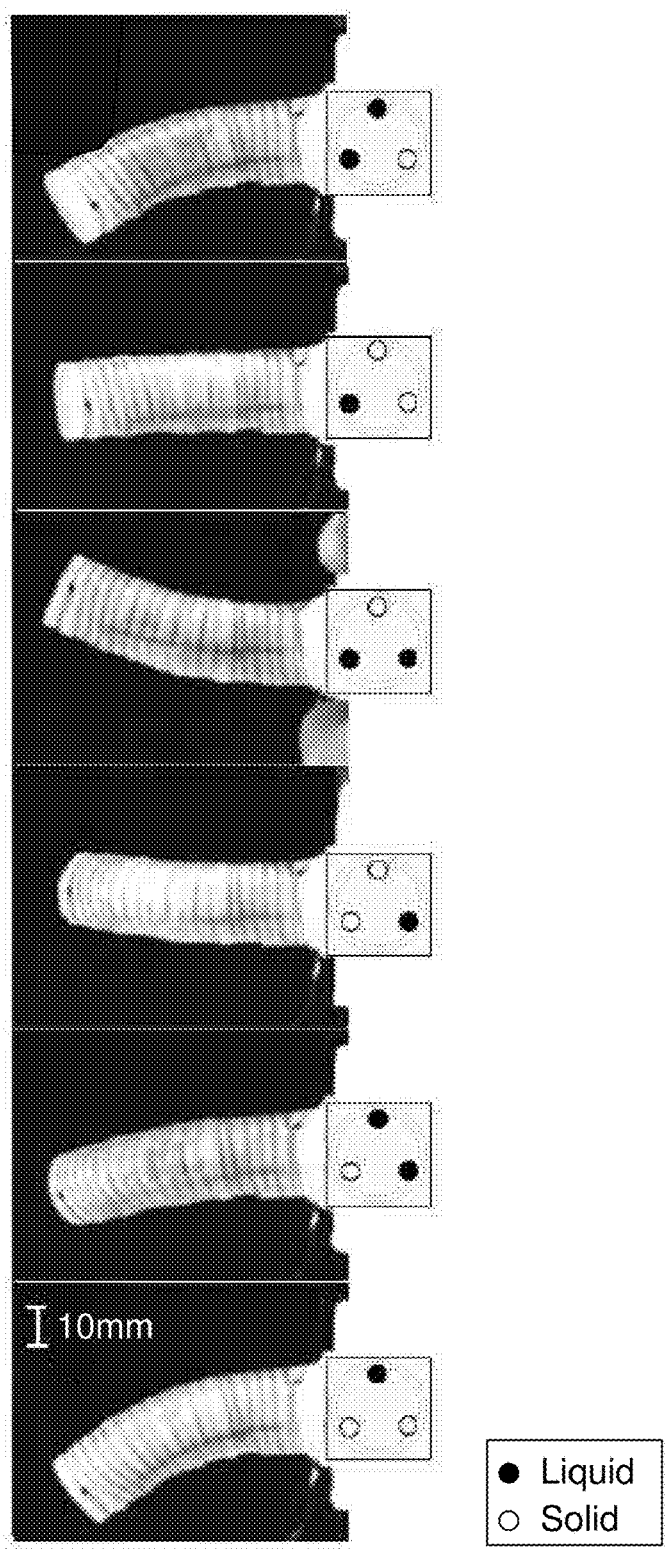
FIG. 9B shows side views of the actuator of FIG. 9A with the variable stiffness devices selectively being in different states for mechanical actuation.
Figure 10:
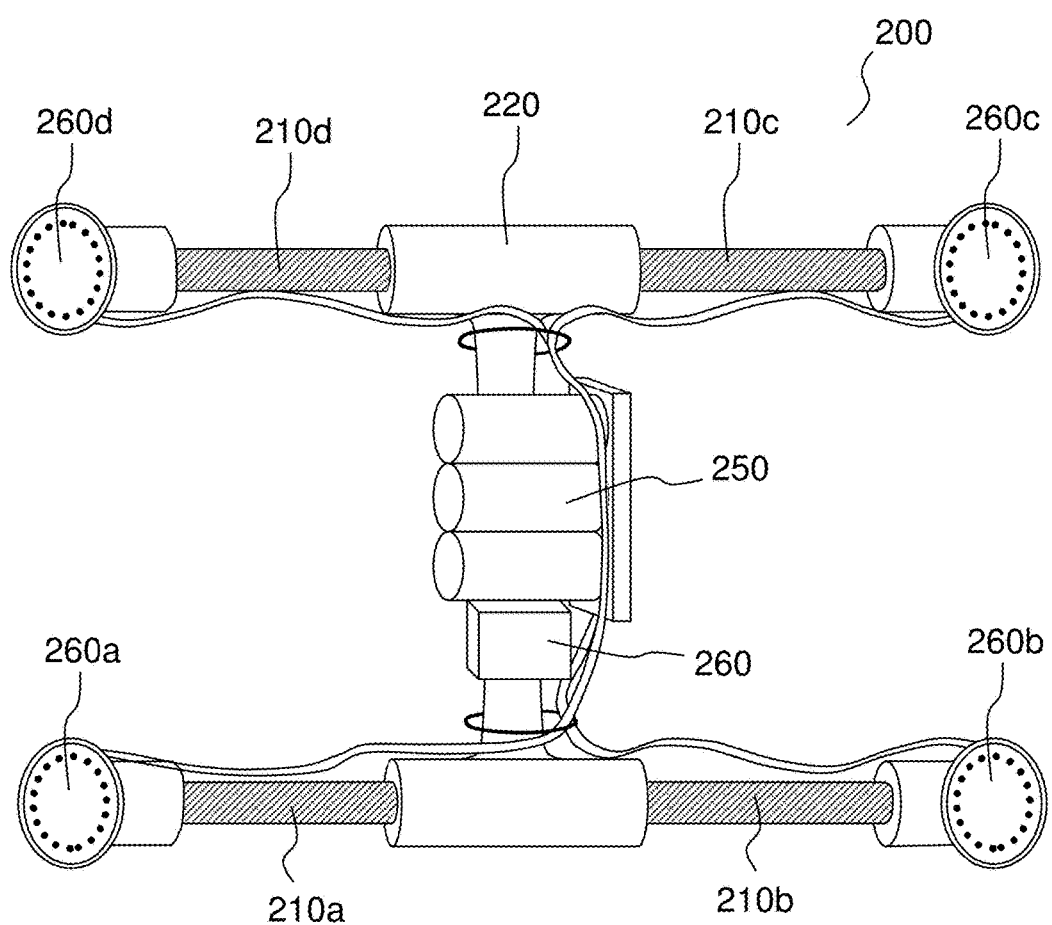
FIG. 10 shows a top view of a foldable multimodal quadrotor or quadcopter using variable stiffness devices, according to another aspect of the present invention.

Lid 150 and tubular structure 130 of fluidic actuator 100 can be made of silicone rubber, for example Ecoflex 0030™, Smooth-on, U.S.A. VST 110a, 110b, and 110c are made of 0.25rp series, with a device length of $L_0$=30 mm, and are integrated into the walls of tubular structure 130. To avoid radial expansion of the actuator 100, reinforcement rings 170 are provided mad arranged circumferentially around tubular structure 130. In a variant, reinforcement rings are made of a cotton fiber that is wound around tubular structure. In background. With the actuator 100 shown in FIGS. 9A and 9B, despite the presence of a single inflatable chamber 120, actuator 100 is able to bend in six different directions in the three-dimensional (3D) space by selective softening of the three VSTs 110a, 110b, and 110c via Joule heating, as shown in FIG. 9B. If no current is supplied to any VSTs 110a, 110b, and 110c, actuator is solid and not extended because cores of VSTs 110a, 110b, 110c are solid. When inflatable interior chamber 120 is inflated, for example with 7 ml of air, the VSTs 110a, 110b, 110c play the roles of a cable that has a fixed length and prevents the elongation of the adjacent portion of the actuator 100.

For example, when a current of 1 A is supplied to one of the VST 110a, 110b, or 110c by a power supply, the corresponding VST switches to a soft state and is able to elongate together with the pressurized soft body formed by tubular structure 130. In the variant shown in FIG. 9A, three VSTs 110a, 110b, 110c are shown, but a fluidic actuator 100 can be made of more VSTs, preferably arranged in parallel, and equidistantly spread out over the tubular structure 130. By increasing the number of VSTs integrated into tubular structure 130 to more than three (3), it is possible to increase the number of bending directions of actuator 100 and improve the shape fixity performance. With the embodiment shown in FIG. 9A, actuator 100 proposes a very simple and compact structure with a simple control scheme owing to the usage of small electric wires plus a single inlet tube with conduit 140 instead of several inlet tubes and valves for modulating the movement purely pneumatically, as seem in classic pneumatic actuators. Similar features are particularly advantageous in miniature applications requiring high torques, where heating and cooling times, which is mainly dependent on the dimension core 20 of VSTs 110a, 110b, 110c, are in the order of few minutes.

FIG. 9B shows a lateral view of the soft fluidic actuator 110, with an external diameter of tubular structure 130 of 20 mm, total length 50 mm, with VSTs 110a, 110b, 110c of 0.25rp, initial length $L_0$=30 mm embedded into walls of tubular structure 130. On the right corner a schematic of the actuator cross section is shown where the state of each VST 110a, 110b, 110b is indicated, with VST in the solid state and VST 2 in the liquid state are not visible. Three conductive wires and a ground wire are used to melt the LMPA of the cores of VSTs 110a, 110b, 110c. As discussed above, with the integration of VST devices into an elastic structure, the VST devices can enable local stiffening and softening, an can therefore the control of multiple degrees of freedom and motion patterns with a limited number of actuators.

FIG. 10 and FIGS. 11A-11C show another aspect of the present invention, where VST devices are used to form arms of a multimodal, foldable quadrotor or quadcopter 200. As shown in the schematic view of FIG. 10, four VST devices 210a, 210b, 210c, and 210d are provided that form the arms of a quadrotor 200, and are connected a common central frame 220 with four motor units 260a, 260b, 260c, and 260d. Mounted to the central frame 220 having an H-shape, a power supply 250 with batteries for VST devices 210a, 210b, 210c, and 210d and the motor units 260a, 260b, 260c, and 260d having foldable propellers (shown in FIG. 11E) can be found, and a control unit 260 for controlling VST devices 210a, 210b, 210c, and 210d and the motor units 260a, 260b, 260c, and 260d. The use of VST devices as exemplarily shown in FIG. 10, the development of multi-functional robots is possible, able to achieve different tasks by adapting the shape of the robot bodies. This morphing potential is due to the VST possibilities to undergo large deformations in the soft state and then to keep a fixed shape once returned to the stiff state. In addition, one VST device can take on different shapes, once in the stiff state. In the variant shown in FIG. 10, four arms are shown that are forming extensions of motor units, but it is also possible to provide any number of arms with VST devices.

Figure 11A:
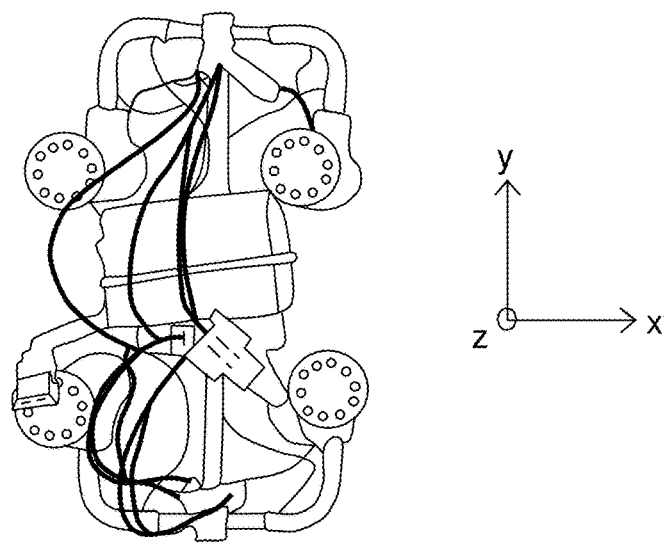
FIGS. 11A-11D are perspective views of different states of the exemplary foldable multimodal quadrotor of FIG. 10.
Figure 11B:
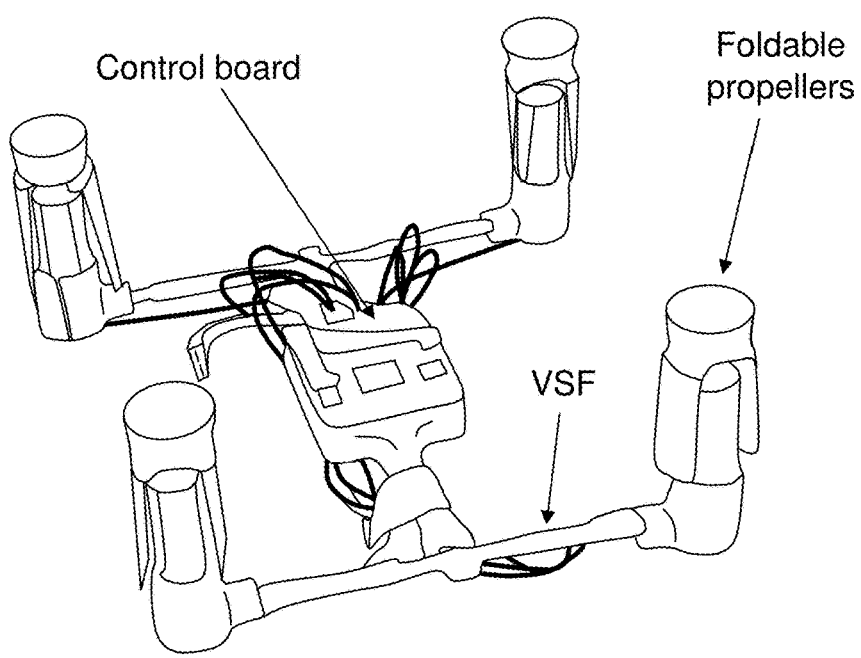

The parts of motor units 260a, 260b, 260c, and 260d that connect to VST and central frame 220 can be made of a light and stiff material such as carbon fibers that are adhesively attached to VST devices 210a, 210b, 210c, and 210d, respectively. With the possibility to put each VST device 210a, 210b, 210c, and 210d into a soft state and a rigid or stiff state, the arms that are formed by the VSTs can take different functional positions. For example, the arms can be (1) folded around central frame 220 in a compact configuration in the X-Y plane, as shown in FIG. 11A, when the arms are in the soft state, for storage, transportation, and shipping, (2) unfolded in a soft state and then put into the stiff state when the arms extend linearly from central frame 220 for deployment in a fly configuration in the X-Y plane, as shown in FIG. 11B, wherein arms formed by VST devices 210a, 210b, 210c, and 210d in a stiff state provide for a sufficiently high bending stiffness to resists to thrust generated by the propellers without deflections and allows maneuverability of quadrotor 200, (3) folded towards the ground in a X-Z plane as shown in FIG. 10C in order to perform terrestrial locomotion by using the propellers like wheels. For this purpose, arms formed by VST devices 210a, 210b, 210c, and 210d were bent in a soft state to form a 90° angle and then switched to a stiff state to allow a full reconfigurability of quadrotor 200, according to the needs (i.e. transportability) and the environment (i.e. aerial, terrestrial). Moreover, it is possible to provide for (4) a planar configuration where VST devices 210a, 210b, 210c, and 210d are linearly extended, but have been twisted by 90° around their own longitudinal axis when they were in the soft state, such that the motor axis of two adjacent motor units 260a, 260d and 260b, 260c are aligned. This allows to configure the quadrotor 200 in a planar fashion. In addition, the self-healing properties makes the quadrotor 200 highly resilient to collisions, as the arms are permitted to fracture upon a collision, and can be self-healed by a melting and re-freezing cycle.

Figure 11C:
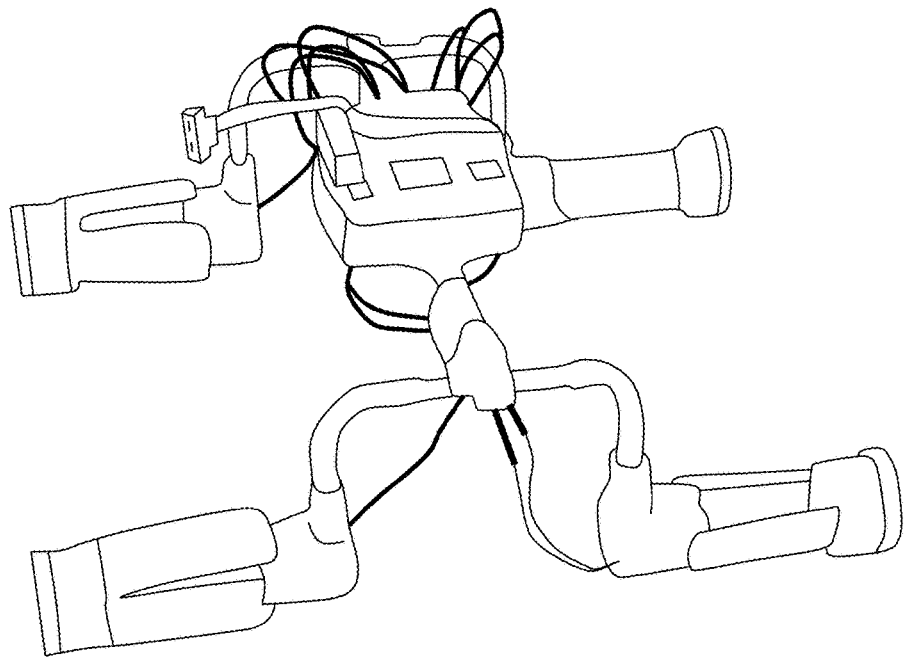
Figure 11D:
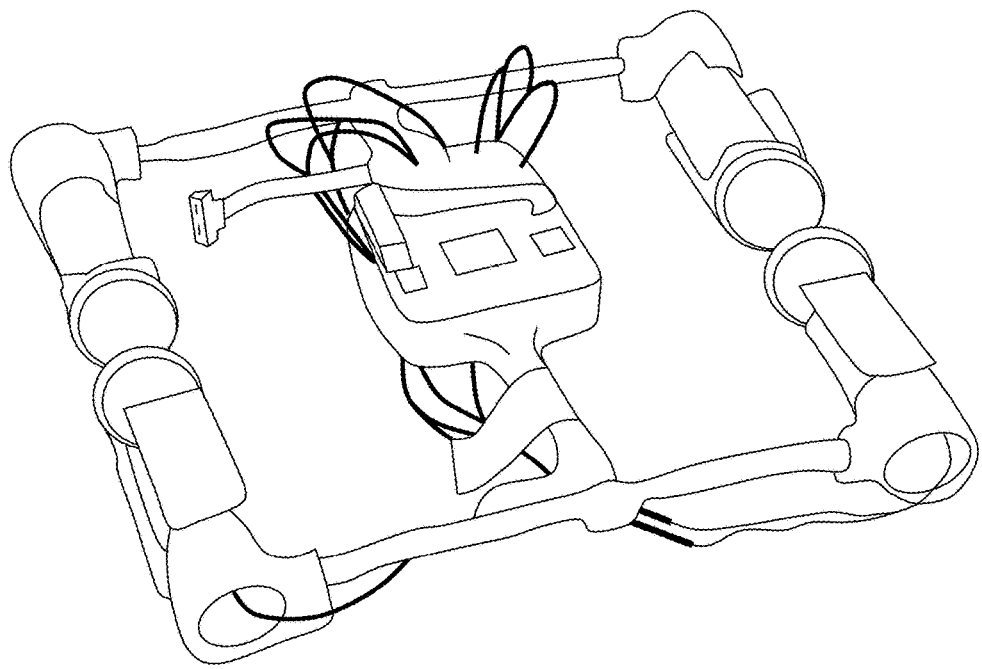
Figure 11E:
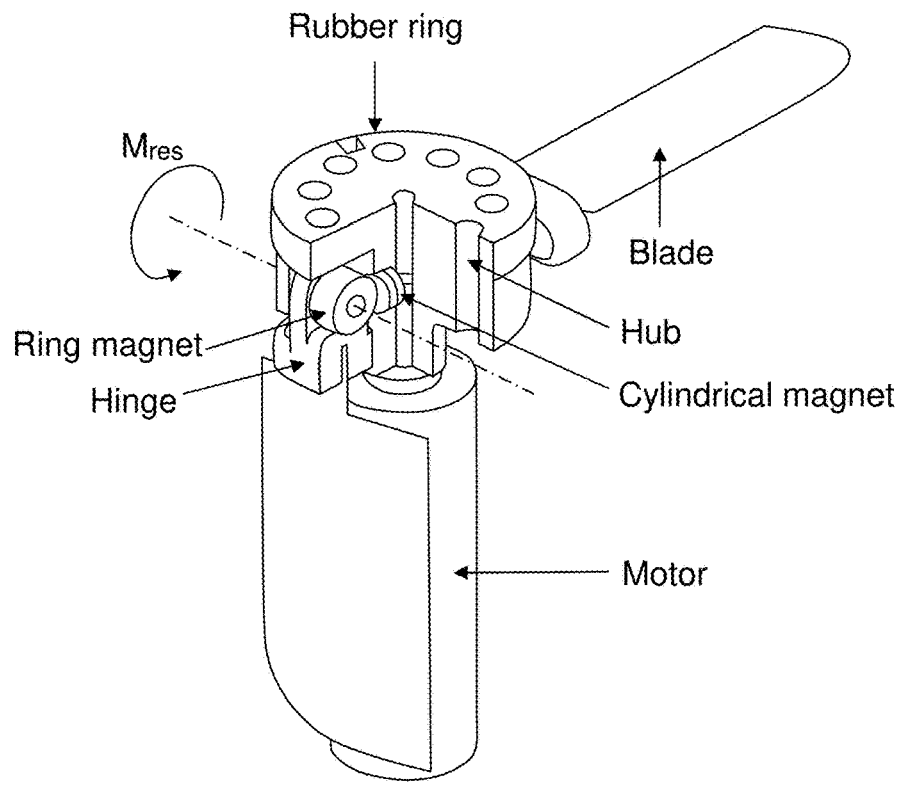
FIG. 11E shows an exemplary motor unit that can be used as a wheel and as a propeller, according to still another aspect of the present invention.
Figure 12A:
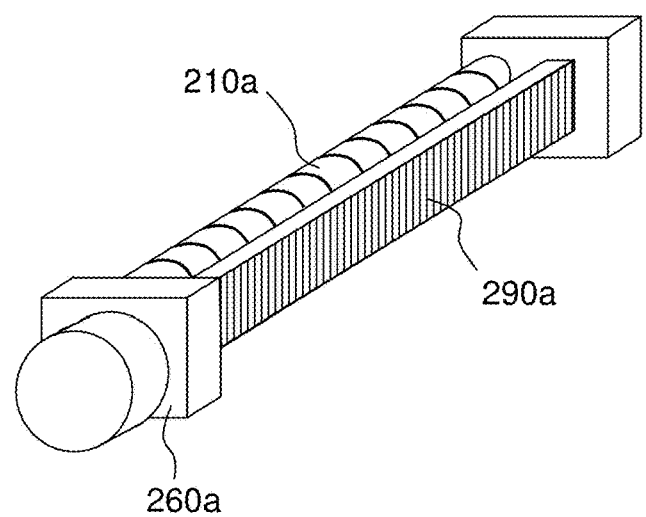
FIGS. 12A-12B shows a perspective view of a variable stiffness device together with an actuator for shaping the variable stiffness device in a soft state, according to yet another aspect of the present invention.
Figure 12B:
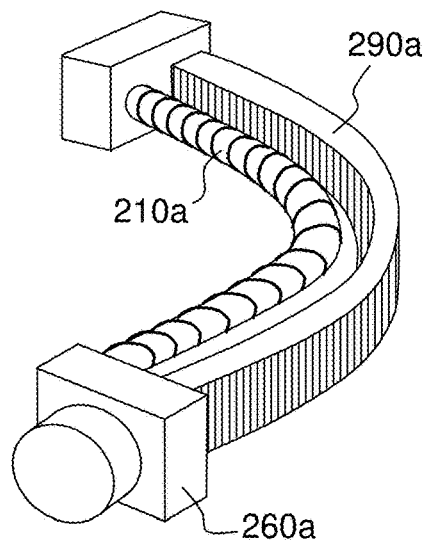
Figure 13A:
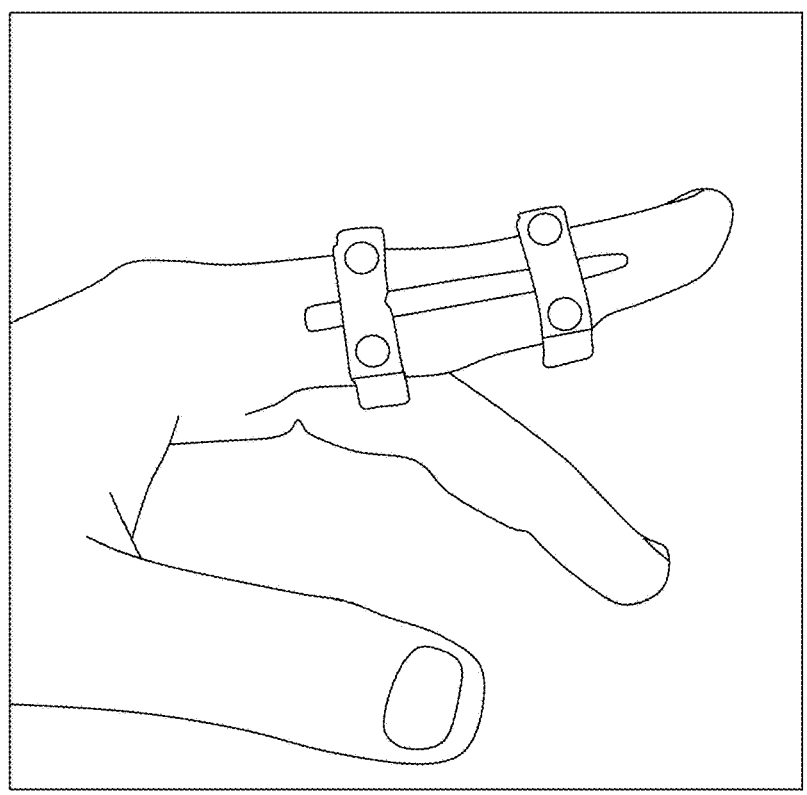
FIGS. 13A-13D shows a finger splint based on two variable stiffness devices in different configurations, with FIGS. 13A-13B showing the finger splint in a stiff straight configuration, and with FIGS. 13C-13D showing the finger splint in a bent configuration, according to another aspect of the present invention.
Figure 13B:
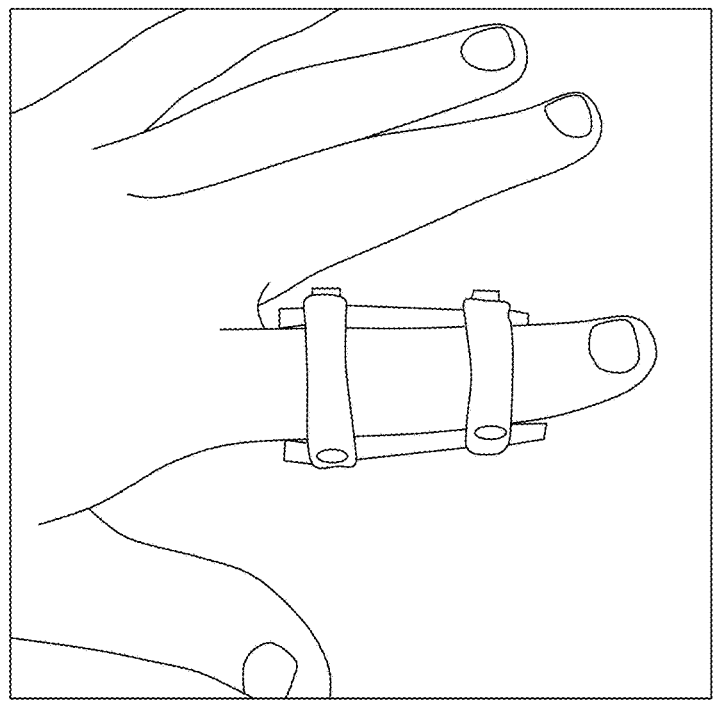
Figure 13C:
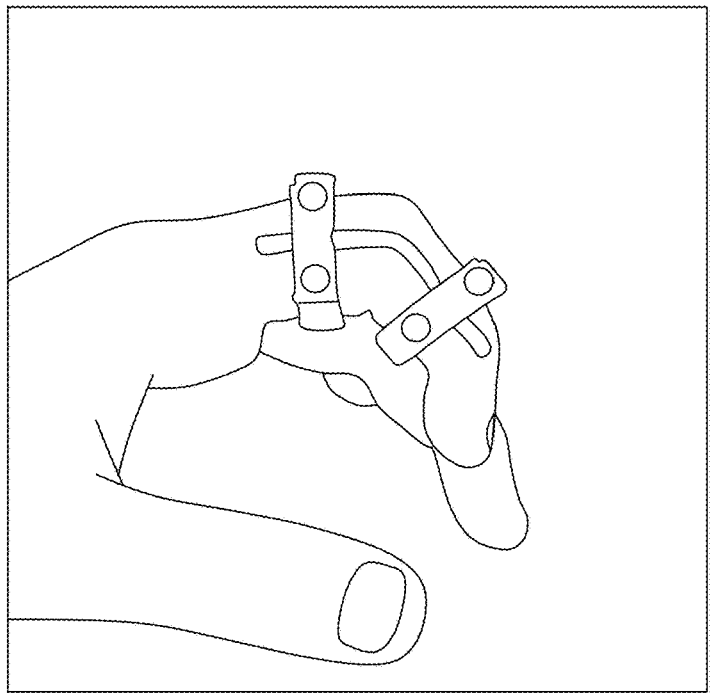
Figure 13D:
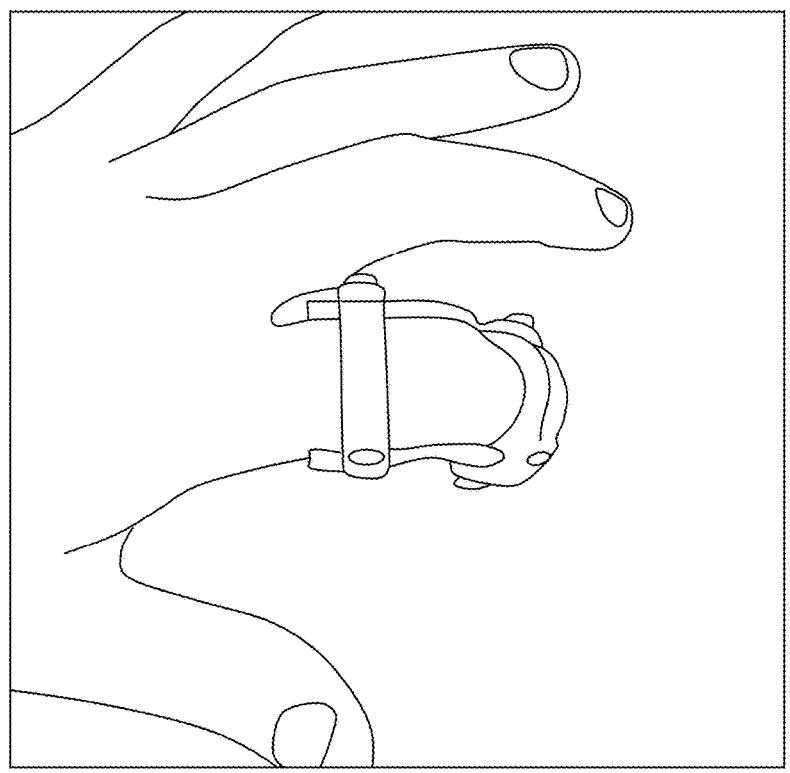

In FIGS. 11A-11D, a top view of the foldable multimodal quadrotor 200 is shown with VST-based arms as devices 210a, 210b, 210c, and 210d with the parameters 0.75rp, VTT device length $L_0$=30 mm, in four different configurations (1), (2), (3), and (4) as discussed above, with FIG. 11A showing a wrapped configuration for easy transportability, with arms folded in the XY plane in a soft state, the quadrotor 200 having the dimensions 45 mm×95 mm, with FIG. 11B a fly configuration, with deployed arms with the quadrotor 200 having the dimensions 95 mm×95 mm, with FIG. 11C in a folded configuration for terrestrial locomotion, with arms folded in the XZ plane, with FIG. D in a planar configuration. The foldable propellers and the motor of motor units 260a, 260b, 260c, and 260d are schematically shown in FIG. 11E. In this figure, an exemplary motor unit is showns with a foldable propeller so that the propeller deployed works for aerial locomotion while the folded propeller enables terrestrial locomotion.

In a soft state, devices 210a, 210b, 210c, and 210d can be brought into different configurations by simply manually bending them. However, it is also possible that an actuator is arranged together with each device 210a, 210b, 210c, and 210d that can perform the bending, while the VST devices are in a soft shape. In a variant, parallel to each device 210a, 210b, 210c, and 210d, and actuator is arranged, that can bend each device 210a, 210b, 210c, and 210d by 90° as shown in FIGS. 11F and 11G. For example, a possible embodiment includes a shape memory alloy (SMA) device that has similar dimensions as the VST devices, and that is arranged in parallel to each device 210a, 210b, 210c, and 210d. As shown in FIG. 11G, the SMA device 290a that is arranged in parallel with a corresponding VST device 210a can bend the VST device 210a to a desired shape when it is in a soft shape. SMA device 290a could be configured such that the temperature required for bending device 290a is higher than the temperature required to melt core of corresponding VST device 210a.

FIGS. 13A-13D shows a rehabilitation device according to another aspect of the present invention, in the variant shown a device that can be used for rehabilitation of fingers of a user or patient. In these figures, a splint is shown formed from two braces that are each connected with two parallel arranged VST devices, at each side of the patient's finger. The splint allows to provide for adaptability and strength for the use of rehabilitation. During the slow restoration of normal form and function of a finger or other portion of the human body after injuries and illnesses affecting the musculoskeletal or neuromuscular system, the rehabilitative process may need modifications and therefore the rehabilitation device has to adapt to the changing requirements. The device shown can be used for the immobilization of a finger of a patient. The VST devices, in a stiff state, assure the support to the injured part, when the position of the joint has to be modified during rehabilitation activity the VST device in a soft state, and follows the finger movements. Therefore, there is no need for taking off the device.

If a new fixed position has to be adopted, for example the extension or bending of the interphalangeal joint shown in FIGS. 13A-13D, the VST devices in a soft state can be deformed and pre-loaded and then it will be able to keep the desired configuration in a stiff state. The exemplary finger splint device is shown in an extended position in FIGS. 13A-13B, and is shown in a bended configuration FIGS. 13C-13D. The VST devices are made of series 0.75rp with a length 30 mm, with a core mode of Cerrolow™ 117 from HiTech Alloys characterized by a melting temperature of 47° C., and the braces fabricated by a 3D printing technique.

Figure 14A:
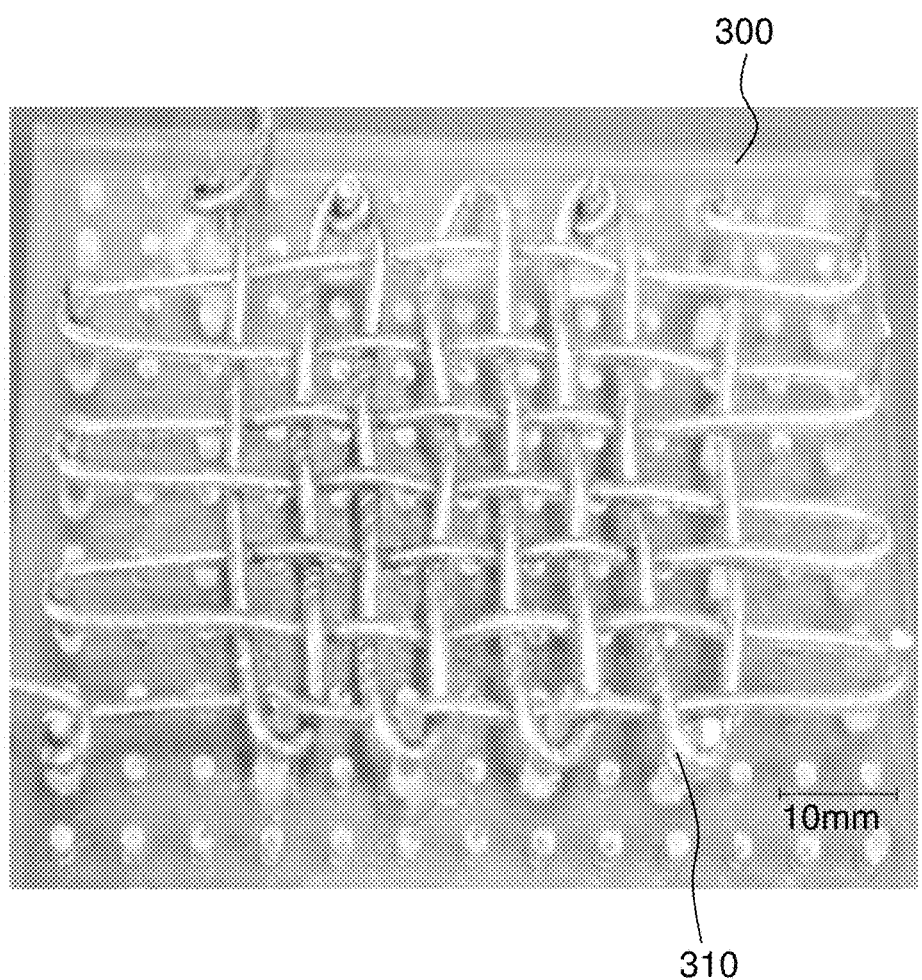
FIGS. 14A-14C shows a fabric based on a long variable stiffness thread with different configurations.

FIGS. 14A-14E shows another aspect of the present invention, where a VST 10 has been used to provide for a knitted or woven actuator. For example, FIG. 14A shows a VST 310 as a knitted fabric portion 300 that could be made into different shapes or patterns. For this purpose, the VST 310 needs to be switched into the soft state, and thereafter can be knitted into different shapes. In the example shown, VST 310 as a thread is knitted into a square matrix woven pattern of a size of about 60 mm to 60 mm. The thickness of the VST 310 thread is about 2 mm.

Figure 14B:
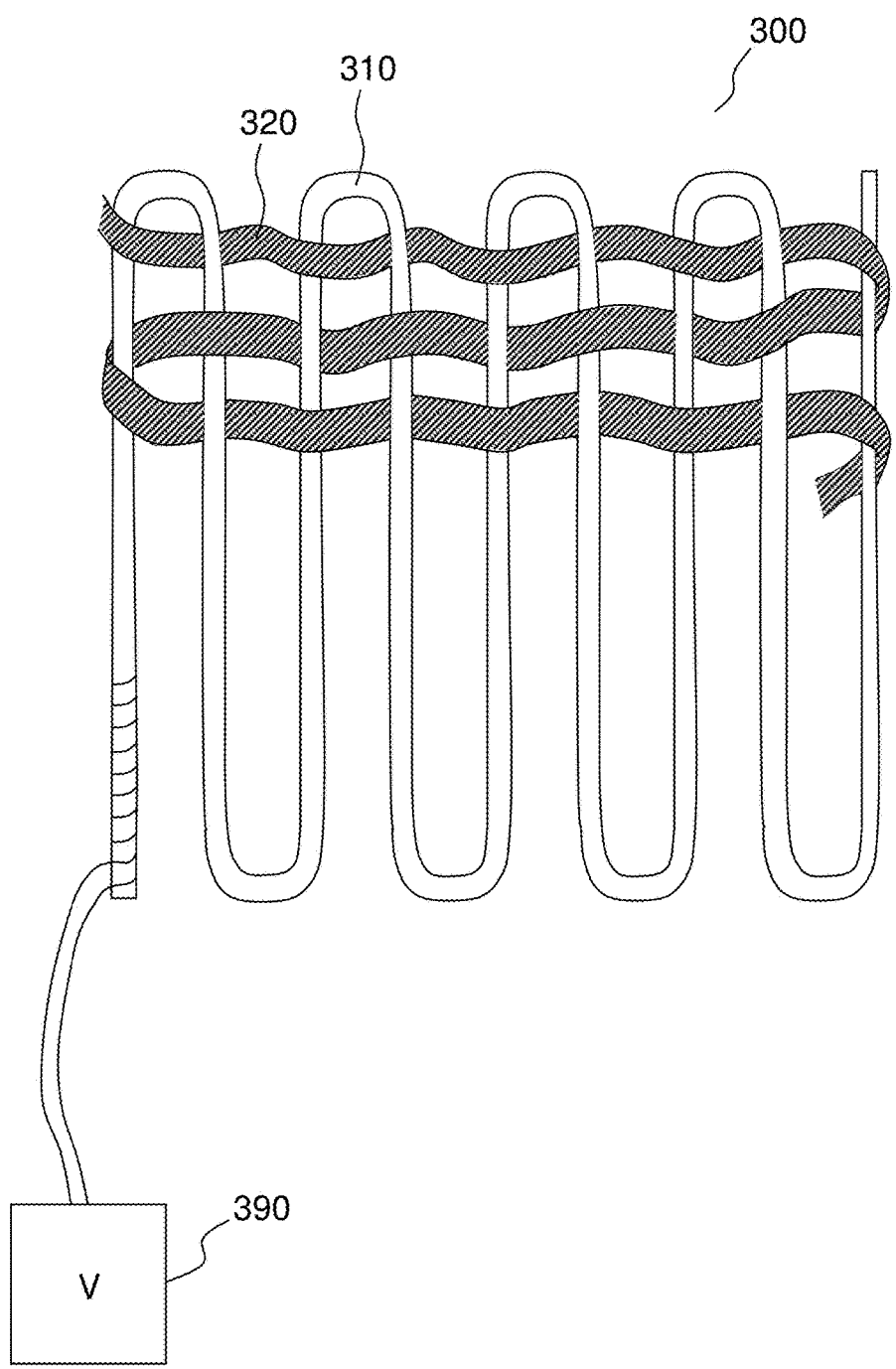
Figure 14C:
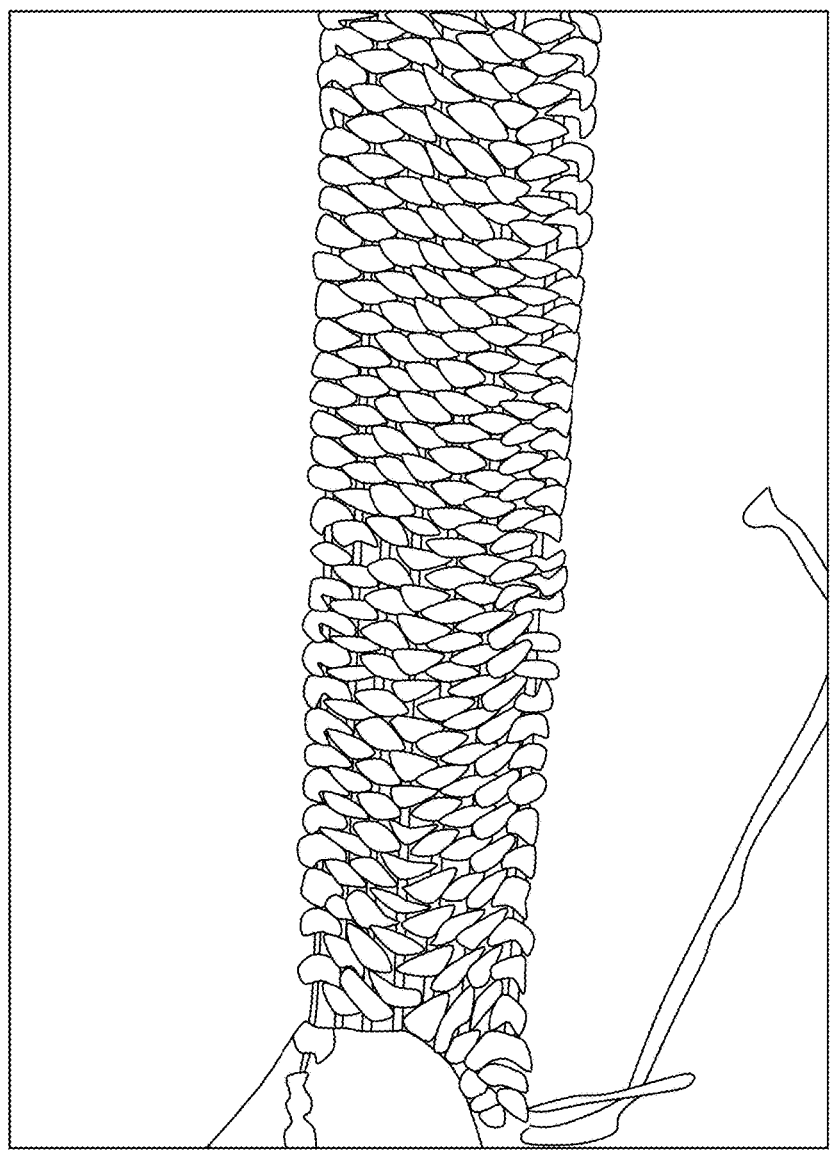
Figure 14D:
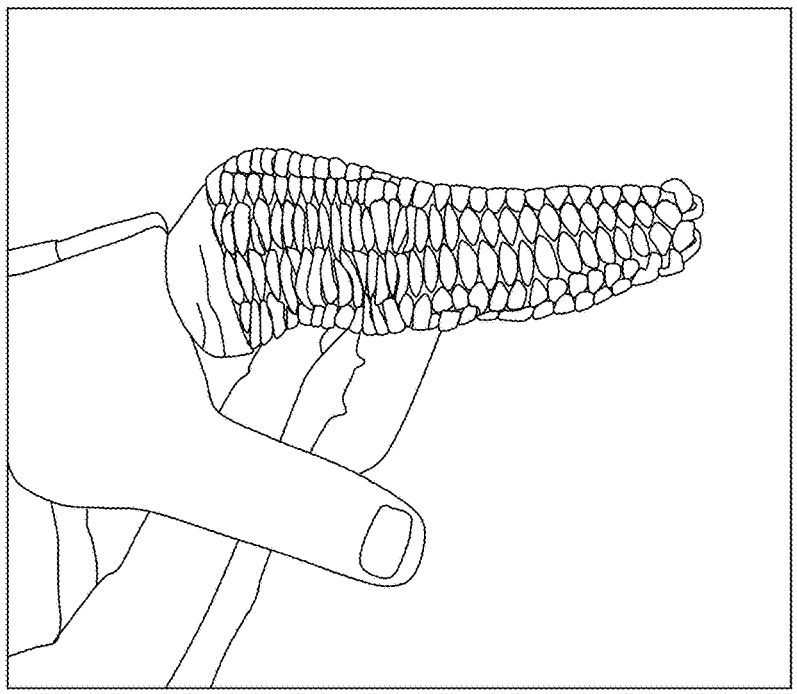
FIGS. 14D-14E shows a wearable cast that is made of such fabrics, according to still another aspect of the present invention.
Figure 14E:
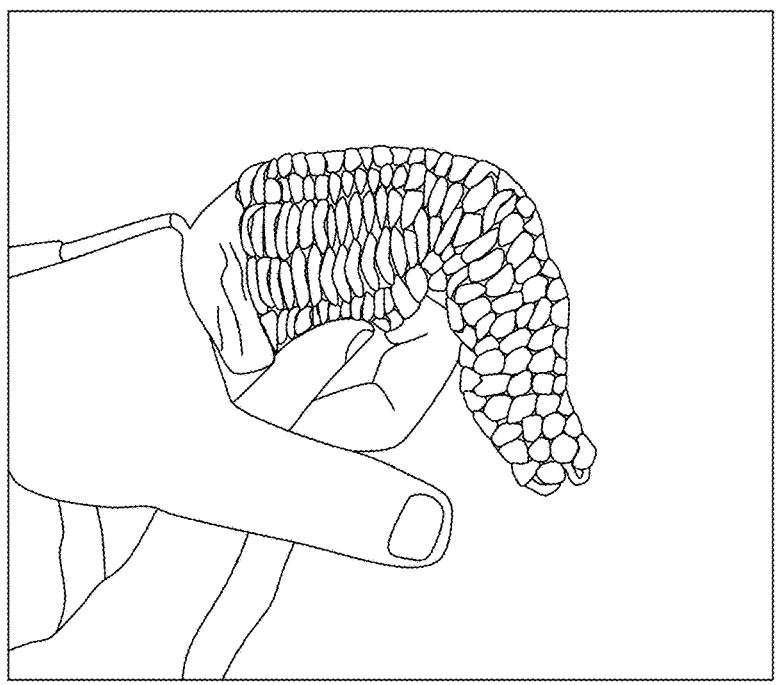

Next, as shown in FIG. 14B, a variable stiffness fabric 300 is provided by knitting a long VST 310 together with a carrier thread 320, for example but not limited to a cotton thread, a fiberglass thread, nylon rope, with the VST 310 connected to a power supply 350. In the soft state, fabric 330 is extensible and conformable while in the stiff state it is rigid and keeps the shape adopted in the previous phase. FIGS. 14D and 14E demonstrate the potential use of fabric 330 as wearable cast, for example for bone injuries. Fabric 330 can adapt to different anatomies and sizes and, once switched to a stiff or solid state, it stabilizes the area during the healing process. Moreover, fabric 330 is recyclable, breathable and more hygienic than conventional plaster. The load bearing capability of fabric 330 can be increased either by using a larger core 20 as long as the total mass of the tissue is comfortable or by different knitting patterns and mesh sizes that result in higher direction-specific rigidity. In the variant shown, the VST 310 is made of series 0.25rp with a 25% pre-strech; 400 mm length, was realized with Cerrolow™ 117 from the company HiTech Alloys, characterized by a melting temperature of 47° C., the white thread is made of cotton, having a weight of 29 grams.

Figure 15A:
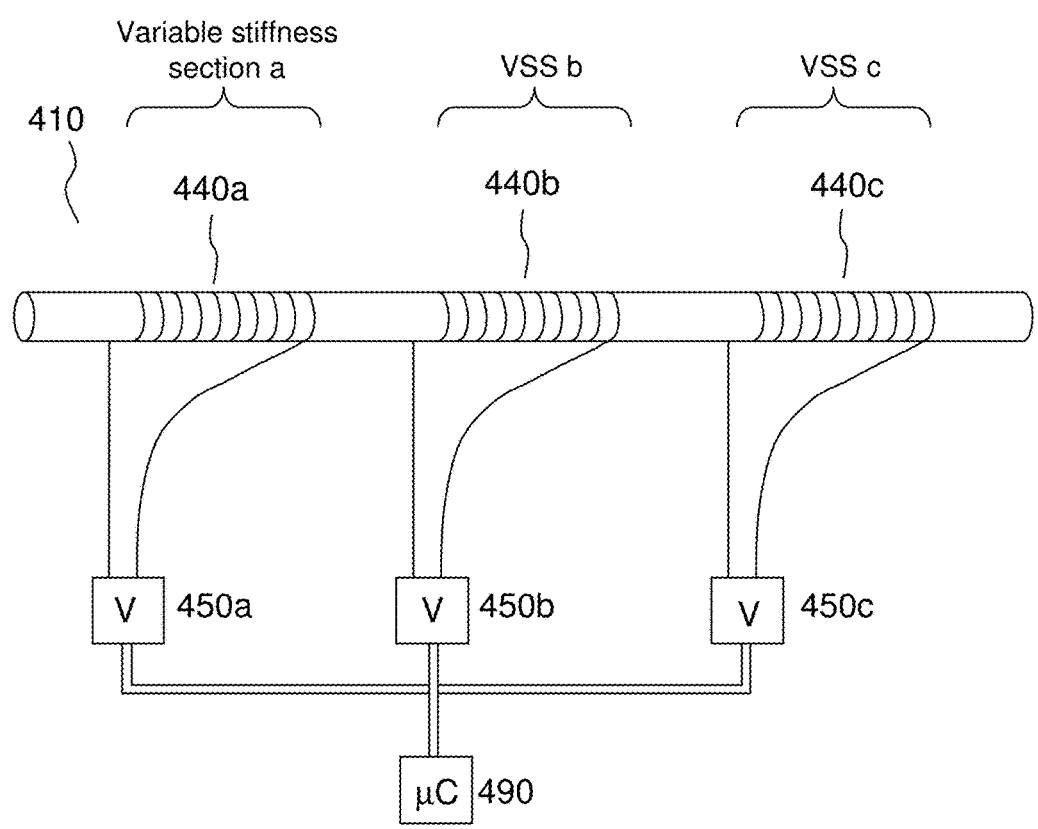
FIG. 15A-15B shows a perspective view of one variable stiffness device having multiple sections with different heating devices made of a wire, ands its arrangement in an actuator as shown in FIG. 9A.
Figure 15B:
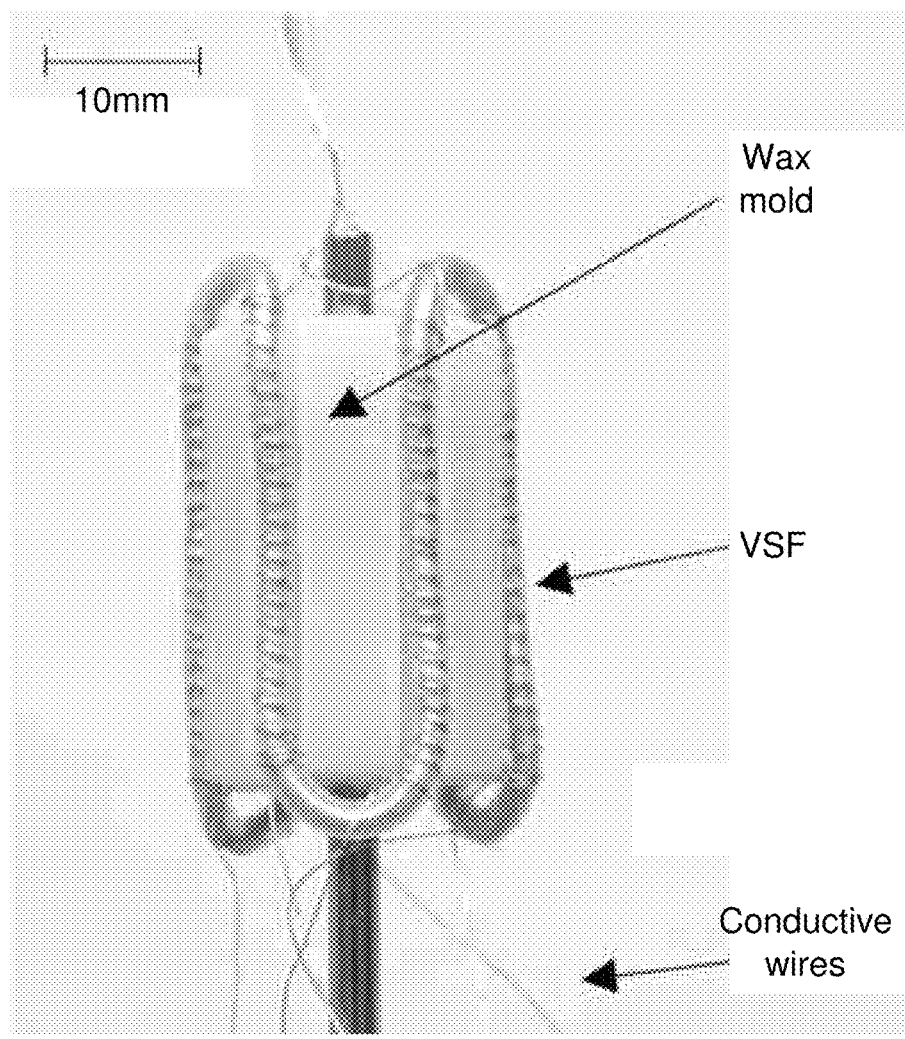

FIGS. 15A-15B show another aspect of the present invention, where a single variable stiffness thread 410 is provided with multiple controllable stiffness sections that have variable stiffness, each section being equipped with a separately controllable heating device 440a, 440b, 440c, each having their own associated power supply 450a, 450b, 450c, respectively, controlled by controller 490. In the variant shown, each of the heating devices 440a, 440b, 440c are wires that are wound around different sections of VST 410. With this arrangement, it is possible to melt and freeze individual sections of the VST 410, but by having only one single core 420 and encapsulation 440. As shown in FIG. 15B, this VST 410 can be integrated into an actuator that is similar as the one shown in FIG. 9A, by using a single VST 410 with the controllable stiffness sections being arranged substantially in parallel, and with the sections having no heating device being bent to form a plurality of switchbacks of the VST 410.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

The invention claimed is:

1. A variable stiffness device, comprising:
a core including a low melting point alloy;
an encapsulation surrounding the core, the encapsulation made of an elastic material and sealing the core; and
a heating device arranged around the encapsulation, configured to heat the core to transition the variable stiffness device from a stiff state to a soft state,
wherein the elastic material of the encapsulation is subject to a tensile stress in a direction along a longitudinal extension of the variable stiffness device, and
wherein upon the transition from the stiff state to the soft state, the encapsulation is configured to recover an original shape as a longitudinal tube that entirely encapsulates the core, the core shaped as a longitudinal rod.

2. The variable stiffness device according to claim 1, wherein the encapsulation is made of silicone.

3. The variable stiffness device according to claim 1, wherein, in the stiff state, the low melting point alloy is in a solid state, and in the soft state, the low melting point alloy is in a liquid state.

4. The variable stiffness device according to claim 1, wherein the heater includes a conductive wire that is wound around the core.

5. The variable stiffness device according to claim 1, wherein the low melting point alloy is subject to a compressive stress in the direction along the longitudinal extension of the thread-like variable stiffness device.

6. The variable stiffness device according to claim 1, wherein for establishing the tensile stress to the encapsulation, the encapsulation is subject to a pre-stretch along an axis of longitudinal extension of the longitudinal tube to subject the core to a compressive stress along the axis.

7. The variable stiffness device according to claim 6, wherein a pre-stretch percentage is between 25% to 70% of a longitudinal expansion from the encapsulation in a non-stretched state.

8. The variable stiffness device according to claim 6, wherein an internal pressure p at the core is in a range between 0.1 MPa and 0.5 MPa resulting from the compressive stress.

9. An actuator, comprising:
a tubular body with an interior chamber; and
a plurality of variable stiffness devices, each of the variable stiffness devices including,
a core including a low melting point alloy;
a tubular encapsulation surrounding the core, the encapsulation made of an elastic material and sealing the core; and
a heating device arranged around the encapsulation, configured to heat the core to transition the variable stiffness device from a stiff state to a soft state,
wherein the elastic material of the encapsulation is subject to a tensile stress in a direction along a longitudinal extension of the thread-like variable stiffness device,
wherein upon the transition from the stiff state to the soft state, the tubular encapsulation is configured to recover an original shape that entirely encapsulates the core, the core shaped as a longitudinal rod inside the tubular encapsulation, and
wherein the plurality of variable stiffness devices are arranged in parallel and are attached to the tubular body, and are also arranged in parallel with a longitudinal extension of the tubular body.

10. The actuator according to claim 9, further comprising:
reinforcement rings that are circumferentially arranged around the tubular body, wherein
the interior chamber of the tubular body is pressurized.

11. The actuator according to claim 9, further comprising:
a control device configured to control a stiffness of the plurality of variable stiffness devices individually.

12. The actuator according to claim 9, wherein for each of the variable stiffness devices, for establishing the tensile stress to the tubular encapsulation, the encapsulation is subject to a pre-stretch along an axis of longitudinal extension of the tubular encapsulation to subject the core to a compressive stress along the axis.

13. The actuator according to claim 12, wherein for each of the variable stiffness devices, a pre-stretch percentage is between 25% to 70% of a longitudinal expansion from the encapsulation in a non-stretched state.

14. The actuator according to claim 9, wherein for each of the variable stiffness devices, an internal pressure p at the core is in a range between 0.1 MPa and 0.5 MPa resulting from the compressive stress.

* * * * *